(12) United States Patent
Mola

(10) Patent No.: US 10,540,250 B2
(45) Date of Patent: Jan. 21, 2020

(54) REDUCING STORAGE REQUIREMENTS FOR STORING MEMORY ADDRESSES AND VALUES

(71) Applicant: MICROSOFT TECHNOLOGY LICENSING, LLC, Redmond, WA (US)

(72) Inventor: Jordi Mola, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 518 days.

(21) Appl. No.: 15/349,474

(22) Filed: Nov. 11, 2016

(65) Prior Publication Data

US 2018/0136869 A1    May 17, 2018

(51) Int. Cl.
G06F 11/30    (2006.01)
G06F 11/34    (2006.01)

(52) U.S. Cl.
CPC .......... *G06F 11/30* (2013.01); *G06F 11/3466* (2013.01); *G06F 11/3471* (2013.01)

(58) Field of Classification Search
CPC ..... G06F 2212/7209; G06F 2212/7207; G06F 11/30; G06F 11/3037; G06F 11/3466; G06F 11/3471
See application file for complete search history.

(56) References Cited

U.S. PATENT DOCUMENTS

| | | | |
|---|---|---|---|
| 4,598,364 A | 7/1986 | Gum et al. | |
| 5,381,533 A | 1/1995 | Peleg et al. | |
| 5,642,478 A | 6/1997 | Chen et al. | |
| 5,905,855 A | 5/1999 | Klaiber et al. | |
| 5,944,841 A | 8/1999 | Christie | |
| 6,009,270 A | 12/1999 | Mann | |
| 6,094,729 A | 7/2000 | Mann | |
| 6,101,524 A | 8/2000 | Choi et al. | |
| 6,167,536 A | 12/2000 | Mann | |
| 6,351,844 B1 | 2/2002 | Bala | |
| 6,480,886 B1 | 11/2002 | Paice | |

(Continued)

OTHER PUBLICATIONS

Uzelac, et al. "Hardware-Based Load Value Trace Filtering for On-the-Fly Debugging", In Proceedings of ACM Transactions on Embedded Computing Systems, vol. 12,Issue 2s, May 2013, 18 pages.

(Continued)

*Primary Examiner* — Tracy A Warren
(74) *Attorney, Agent, or Firm* — Workman Nydegger

(57) ABSTRACT

Recording a memory address includes identifying a first subset of high bits of the memory address, determining that a first value of the first subset equals a second value of a group of high bits already recorded, recording a second subset of low bits of the memory address while refraining from recording the first subset, and setting one or more flag bits to indicate that only the second subset were recorded. Also, recording a memory value includes identifying a plurality of groups of consecutive bits of the memory value, determining that a first group contains bits having a defined pattern and that a second group contains bits lacking the defined pattern, recording the second group while refraining from recording at least a portion of the first group, and setting one or more flag bits to indicate that the first group was not recorded.

16 Claims, 12 Drawing Sheets

(56) References Cited

U.S. PATENT DOCUMENTS

| | | | |
|---|---|---|---|
| 6,553,511 B1 | 4/2003 | DeKoning et al. |
| 6,634,011 B1 | 10/2003 | Petlier et al. |
| 6,728,949 B1 | 4/2004 | Bryant et al. |
| 6,772,324 B2 | 8/2004 | Akkary et al. |
| 6,854,108 B1 | 2/2005 | Choi |
| 7,055,070 B1 | 5/2006 | Uhler et al. |
| 7,089,400 B1 | 8/2006 | Pickett et al. |
| 7,178,133 B1 | 2/2007 | Thekkath |
| 7,181,728 B1 | 2/2007 | Thekkath |
| 7,380,253 B2 | 5/2008 | Yamauchi et al. |
| 7,448,025 B2 | 11/2008 | Kalafatis et al. |
| 7,454,486 B2 | 11/2008 | Kaler et al. |
| 7,478,394 B1 | 1/2009 | de Dinechin et al. |
| 7,620,938 B2 | 11/2009 | Edwards |
| 7,676,632 B2 | 3/2010 | Miller |
| 7,877,630 B1 | 1/2011 | Favor et al. |
| 7,958,497 B1 | 6/2011 | Lindo et al. |
| 7,984,129 B2 | 7/2011 | Vaught |
| 8,010,337 B2 | 8/2011 | Narayanan et al. |
| 8,087,017 B1 | 12/2011 | Whaley et al. |
| 8,296,775 B2 | 10/2012 | Thornton et al. |
| 8,423,965 B2 | 4/2013 | Goel et al. |
| 8,427,347 B1 * | 4/2013 | Chai ............... H03M 7/30 341/51 |
| 8,468,501 B2 | 6/2013 | Subhraveti |
| 8,484,516 B2 | 7/2013 | Giannini et al. |
| 8,499,200 B2 | 7/2013 | Cathro |
| 8,543,988 B2 | 9/2013 | Shimazaki et al. |
| 8,612,650 B1 | 12/2013 | Carrie et al. |
| 8,719,796 B2 | 5/2014 | Rosu et al. |
| 8,769,511 B2 | 7/2014 | Gal et al. |
| 8,832,682 B2 | 9/2014 | Xu et al. |
| 9,015,441 B2 | 4/2015 | Worthington et al. |
| 9,058,415 B1 | 6/2015 | Serebrin et al. |
| 9,164,809 B2 | 10/2015 | Tsirkin et al. |
| 9,268,666 B2 | 2/2016 | Law et al. |
| 9,280,379 B2 | 3/2016 | Tsirkin et al. |
| 9,300,320 B2 | 3/2016 | Ansari et al. |
| 9,329,884 B2 | 5/2016 | Strong et al. |
| 9,361,228 B2 | 6/2016 | Turner et al. |
| 9,535,815 B2 | 1/2017 | Smith et al. |
| 9,569,338 B1 | 2/2017 | Bradbury et al. |
| 9,767,237 B2 | 9/2017 | Suresh et al. |
| 9,864,538 B1 * | 1/2018 | Johnson ............. G06F 3/0626 |
| 9,934,127 B1 | 4/2018 | Mola et al. |
| 10,031,833 B2 | 7/2018 | Mola |
| 10,031,834 B2 | 7/2018 | Mola |
| 10,042,737 B2 | 8/2018 | Mola |
| 2001/0034854 A1 | 10/2001 | Mukherjee |
| 2002/0078124 A1 | 6/2002 | Baylor et al. |
| 2002/0124237 A1 | 9/2002 | Sprunt et al. |
| 2002/0144101 A1 | 10/2002 | Wang et al. |
| 2003/0079205 A1 | 4/2003 | Miyao |
| 2003/0126508 A1 | 7/2003 | Litt |
| 2003/0233636 A1 | 12/2003 | Crawford |
| 2004/0073838 A1 * | 4/2004 | Tabe ............... G06F 11/3636 714/29 |
| 2004/0117690 A1 | 6/2004 | Andersson |
| 2004/0153635 A1 | 8/2004 | Kaushik et al. |
| 2004/0243894 A1 | 12/2004 | Smith et al. |
| 2005/0155019 A1 | 7/2005 | Levine et al. |
| 2005/0223364 A1 | 10/2005 | Peri et al. |
| 2006/0036579 A1 | 2/2006 | Byrd et al. |
| 2006/0112310 A1 | 5/2006 | Mchale et al. |
| 2006/0230390 A1 | 10/2006 | Alexander et al. |
| 2007/0106287 A1 | 5/2007 | Boatright et al. |
| 2007/0106827 A1 | 5/2007 | Boatright et al. |
| 2007/0130237 A1 | 6/2007 | Altman et al. |
| 2007/0150881 A1 | 6/2007 | Khawand et al. |
| 2007/0168989 A1 | 7/2007 | Edwards et al. |
| 2007/0186055 A1 | 8/2007 | Jacobson et al. |
| 2007/0214342 A1 | 9/2007 | Newburn et al. |
| 2007/0220361 A1 | 9/2007 | Barnum et al. |
| 2008/0065810 A1 | 3/2008 | Spanel et al. |
| 2008/0091867 A1 | 4/2008 | Plondke et al. |
| 2008/0114964 A1 | 5/2008 | Davis et al. |
| 2008/0115113 A1 | 5/2008 | Codrescu et al. |
| 2008/0140935 A1 | 6/2008 | Cypher et al. |
| 2008/0215920 A1 | 9/2008 | Mayer et al. |
| 2008/0215922 A1 | 9/2008 | Cheng et al. |
| 2008/0250207 A1 | 10/2008 | Davis et al. |
| 2008/0256396 A1 | 10/2008 | Giannini et al. |
| 2008/0270745 A1 | 10/2008 | Saha et al. |
| 2008/0288826 A1 | 11/2008 | Nemoto |
| 2009/0006729 A1 | 1/2009 | Piazza et al. |
| 2009/0013133 A1 | 1/2009 | Cypher et al. |
| 2009/0031173 A1 | 1/2009 | Al-omari et al. |
| 2009/0037886 A1 | 2/2009 | McCoy et al. |
| 2009/0106278 A1 | 4/2009 | Ramacher et al. |
| 2009/0138859 A1 | 5/2009 | Chen et al. |
| 2009/0144742 A1 | 6/2009 | Subhraveti |
| 2009/0319753 A1 | 12/2009 | Welc et al. |
| 2010/0106912 A1 | 4/2010 | Cypher et al. |
| 2010/0162247 A1 | 6/2010 | Welc et al. |
| 2010/0205484 A1 | 8/2010 | Dragicevic et al. |
| 2010/0223446 A1 | 9/2010 | Katariya et al. |
| 2010/0250856 A1 | 9/2010 | Owen et al. |
| 2010/0251031 A1 | 9/2010 | Nieh et al. |
| 2010/0268995 A1 | 10/2010 | Goodman et al. |
| 2011/0029821 A1 | 2/2011 | Chow et al. |
| 2011/0271070 A1 | 11/2011 | Worthington et al. |
| 2011/0276761 A1 | 11/2011 | Saha et al. |
| 2011/0288847 A1 | 11/2011 | Narayanan et al. |
| 2012/0095728 A1 | 4/2012 | Ubukata |
| 2012/0096441 A1 | 4/2012 | Law et al. |
| 2013/0036403 A1 | 2/2013 | Geist |
| 2013/0086567 A1 | 4/2013 | Inoue et al. |
| 2014/0040557 A1 | 2/2014 | Frey et al. |
| 2014/0059523 A1 | 2/2014 | Frazier et al. |
| 2014/0215443 A1 | 7/2014 | Voccio et al. |
| 2014/0281710 A1 | 9/2014 | Cain et al. |
| 2014/0372987 A1 | 12/2014 | Strong et al. |
| 2015/0012699 A1 | 1/2015 | Rizzo et al. |
| 2015/0089155 A1 | 3/2015 | Busaba et al. |
| 2015/0089301 A1 | 3/2015 | Laurenti |
| 2015/0319221 A1 | 11/2015 | Zrnievski et al. |
| 2015/0331804 A1 | 11/2015 | Vajapeyam |
| 2015/0355996 A1 | 12/2015 | Smith et al. |
| 2015/0378870 A1 | 12/2015 | Marron et al. |
| 2016/0283748 A1 | 9/2016 | Oh et al. |
| 2016/0292061 A1 | 10/2016 | Marron et al. |
| 2017/0052876 A1 | 2/2017 | Svensson et al. |
| 2017/0140082 A1 | 5/2017 | Suresh et al. |
| 2017/0161173 A1 | 6/2017 | Bradbury et al. |
| 2017/0192886 A1 | 7/2017 | Boehm et al. |
| 2017/0286111 A1 | 10/2017 | Pereira et al. |
| 2018/0052631 A1 * | 2/2018 | Kalyanasundharam .................... G06F 3/061 |
| 2018/0060213 A1 | 3/2018 | Mola |
| 2018/0060214 A1 | 3/2018 | Mola |
| 2018/0060215 A1 | 3/2018 | Mola |
| 2018/0113788 A1 | 4/2018 | Mola |
| 2018/0113789 A1 | 4/2018 | Mola |
| 2018/0113806 A1 | 4/2018 | Mola |
| 2018/0113809 A1 | 4/2018 | Mola |
| 2018/0253369 A1 | 9/2018 | O'dowd et al. |
| 2018/0285136 A1 | 10/2018 | Mola |
| 2018/0314623 A1 | 11/2018 | Mola |
| 2019/0004930 A1 | 1/2019 | Mola |
| 2019/0018755 A1 | 1/2019 | Mola |
| 2019/0227836 A1 | 7/2019 | Mola |
| 2019/0235991 A1 | 8/2019 | Mola |
| 2019/0324907 A1 | 10/2019 | Mola |

OTHER PUBLICATIONS

Shaaban, et al. "Improving Trace Cache Hit Rates Using the Sliding Window Fill Mechanism and Fill Select Table", In Proceedings of the 2004 workshop on Memory system performance, Jun. 8, 2004, pp. 36-41.

""'Recording Inferior's Execution and Replaying It'"', Published on: Nov. 18, 2012 Available at:https://sourceware.org/gdb/onlinedocs/gdb/Process-Record-and-Replay.html".

(56) References Cited

OTHER PUBLICATIONS

""""IntelliTrace"", Retrieved on: May 26, 2016Available at:https://msdn.microsoft.com/en-us/library/dd264915.aspx".
Bhansali, et al., "Framework for Instruction-level Tracing and Analysis of Program Executions", In Proceedings of the 2nd international conference on Virtual execution environments, Jun. 14, 2006, pp. 154-163.
King, et al., "Debugging operating systems with time-traveling virtual machines", In Proceedings of the USENIX Annual Technical Conference, Apr. 10, 2005, pp. 1-15.
Barr, et al., "TARDIS: Affordable Time-Travel Debugging in Managed Runtimes", In Proceedings of the ACM International Conference on Object Oriented Programming Systems Languages & Applications, Oct. 20, 2014, 16 pages.
"Kleen, Andi, ""Adding Processor Trace support to Linux"", Published on: Jul. 1, 2015Available at:https://lwn.net/Articles/648154/".
""""Elm's Time Traveling Debugger"", Published on: Apr. 16, 2014Available at: http://debug.elm-lang.org/".
Guo, et al., "R2: An Application-Level Kernel for Record and Replay", In Proceedings of the 8th USENIX conference on Operating systems design and implementation, Dec. 8, 2008, 16 pages.
"Sharma, Suchakrapani Datt, ""Hardware Tracing with Intel Processor Trace"", Published on: Dec. 10, 2015Available at: https://hsdm.dorsal.polymtl.ca/system/files/10Dec2015_0.pdf".
Mercer, et al., "Model Checking Machine Code with the GNU Debugger", In Proceedings of 12th International SPIN Workshop, Aug. 22, 2005, 15 pages.
Narayanasamy, et al., "BugNet: Continuously Recording Program Execution for Deterministic Replay Debugging", In Proceedings of the 32nd annual international symposium on Computer Architecture, Jun. 4, 2005, 12 pages.
""""rr: Lightweight recording & deterministic debugging"", Retrieved on: May 19, 2016Available at: http://rr-project.org/".
"Brady, Fiorenza, ""Cambridge University Study States Software Bugs Cost Economy $312 Billion Per Year"", Published on: Jan. 8, 2013Available at:http://www.prweb.com/releases/2013/1/prweb10298185.htm".
"Charles, ""Arun Kishan: Inside Windows 7—Farewell to the Windows Kernel Dispatcher Lock"", Published on: Aug. 6, 2009Available at: https://channel9.msdn.com/shows/Going+Deep/Arun-Kishan-Farewell-to-the-Windows-Kernel-Dispatcher-Lock/".
Xu et al. "ReTrace: Collecting Execution Trace with Virtual Machine Deterministic Replay" In Proceedings of the Third Annual Workshop on Modeling, Benchmarking and Simulation, Jun. 2007, 8 pages.
Tchagou et al. "Reducing Trace Size in Multimedia Applications Endurance Tests" In Proceedings of Design Automation & Test in Europe Conference & Exhibition, Mar. 2015, 2 pages.
Rivers et al; Utilizing Reuse Information in Data Cache Management, published by ACM 1998, pp. 449-456 (retrieved on Mar. 16, 2018), Retrieved from the Internet <URL:http://delivery.acm.org/10.1145/280000/277941/p449-rivers.pdf?ip=151.207.250.51&id=277941&acc=Active%20SERVICE&key=C15944E53D0ACA63%2E4D4702B0C3E38B35%2E4D4702B0C3E38B35%2E4D470 . . . >.
Sahuquillo, et al; The Filter Cache: A Run-Time Cache Management Approach, Published in: EUROMICRO Conference, 1999. Proceedings. 25th, pp. 1-8 (retrieved on Mar. 16, 2018), Retrieved from the Internet <Url:http://ieeexplore.ieee.org/stamp/stamp.jsp?tp=&arnumber=794504>.
Notice of Allowance cited in U.S. Appl. No. 15/349,555 dated Mar. 29, 2018.
Notice of Allowance cited in U.S. Appl. No. 15/253,027 dated Mar. 21, 2018.
Lai et al. "A Versatile Data Cache for Trace Buffer Support" in Journal of IEEE Transactions on Circuits and Systems, vol. 61, Issue 11, Nov. 2014, pp. 3145-3154.
Liang et al. "Improved Procedure Placement for Set Associative Caches" In Proceedings of the 47th Design Automation Conference, Jun. 13, 2010, pp. 344-349.
Liang et al. "Instruction Cache Locking Using Temporal Reuse Profile", In Proceedings of the 47th Design Automation Conference, Jun. 13, 2010, pp. 344-349.
"Notice of Allowance Issued in U.S. Appl. No. 15/488,282", dated Feb. 14, 2019, 11 Pages.
"Non Final Office Action Issued in U.S. Appl. No. 15/604,408", dated Jan. 18, 2019, 22 Pages.
Office Action cited in U.S. Appl. No. 15/252,998 dated Sep. 20, 2017.
Office Action cited in U.S. Appl. No. 15/349,555 dated Oct. 6, 2017.
Office Action cited in U.S. Appl. No. 15/253,027 dated Oct. 10, 2017.
Rower, et al: "Two hardware-based approaches for deterministic multiprocessor replay", Published Jun. 1, 2009, pp. 93-100.
"International Search Report and the Written Opinion, issued in PCT Application No. PCT/US2017/048094," dated Nov. 10, 2017.
Jiang, et al; CARE: Cache Guided Deterministic Replay for Concurrent Java Program, Published by ACM 2014, pp. 1-11.
Lee, et al; Offline Symbolic Analysis for Multi-Processor Execution Replay, Published by ACM 2009, pp. 564-575.
"Non Final Office Action Issued in U.S. Appl. No. 16/057,353", dated Sep. 11, 2019, 8 Pages.
Xu, "A "Flight Data Recorder" for Enabling Full-System Multiprocessor Deterministic Replay", In Proceedings of the 30th Annual International Symposium on Computer Architecture, Jun. 9, 2003, 12 Pages.
"Non Final Office Action Issued in U.S. Appl. No. 16/029,372", dated Nov. 6, 2019, 38 Pages.
Lee, et al., "Offline Symbolic Analysis to Infer Total Store Order", In Proceedings of IEEE 17th International Symposium on High Performance Computer Architecture, Feb. 12, 2011, pp. 357-368.
Wang, et al., "Restore: Symptom-Based Soft Error Detection in Microprocessirs", In Journal of IEEE Transactions on Dependable and Secure Computing, vol. 3, Issue: 3, Aug. 14, 2006, pp. 188-201.

* cited by examiner

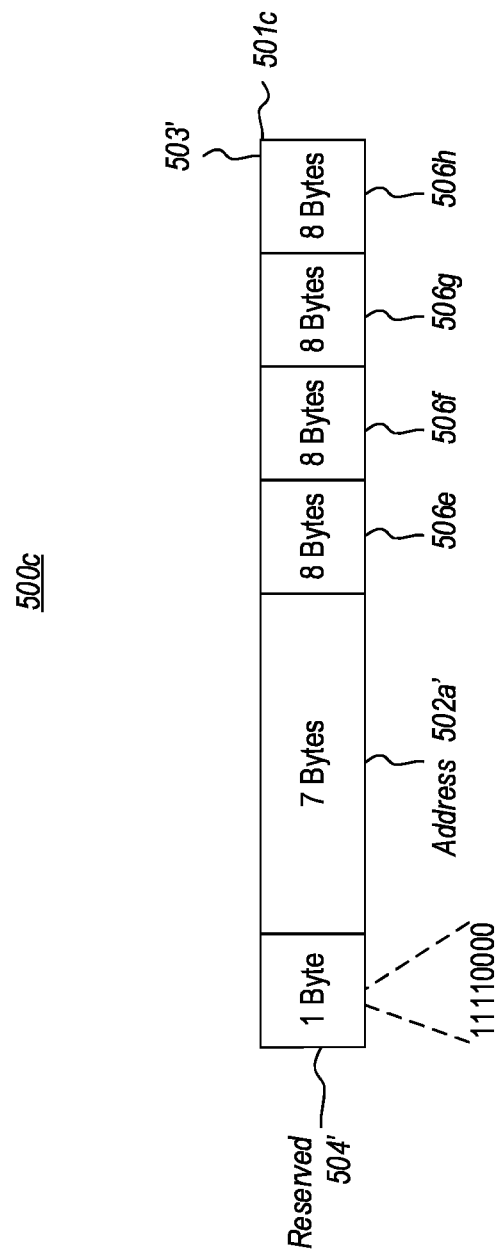

REDUCING STORAGE REQUIREMENTS FOR STORING MEMORY ADDRESSES AND VALUES

BACKGROUND

When writing code during the development of software applications, developers commonly spend a significant amount of time "debugging" the code to find runtime errors in the code. For example, developers may take several approaches to reproduce and localize a source code bug, such as observing behavior of a program based on different inputs, inserting debugging code (e.g., to print variable values, to track branches of execution, etc.), temporarily removing code portions, etc. Tracking down runtime errors to pinpoint code bugs can occupy a significant portion of application development time.

Many types of debugging applications ("debuggers") have been developed in order to assist developers with the code debugging process. Many such tools offer developers the ability to trace, visualize, and alter the execution of computer code. For example, debuggers may visualize the execution of code instructions, may present variable values at various times during code execution, may enable developers to alter code execution paths, and/or may enable developers to set "breakpoints" in code (which, when reached during execution, causes execution of the code to be suspended), among other things.

An emerging form of debugging applications enable "time travel," "reverse," or "historic" debugging, in which execution of a program is recorded by a trace application into one or more trace files, which can be then be used to replay execution of the program for forward and backward analysis. One factor that can limit a "time travel" debugger's utility, is trace file size. For example, a large trace file can consume significant storage resources (which, in turn, can affect an amount of historical execution time that can be kept for a program), can affect performance of both a tracing application and a debugging application, can affect performance of the program being traced, etc.

BRIEF SUMMARY

At least some embodiments described herein relate to reducing the amount of storage and/or memory resources needed to represent memory addresses and/or memory values in a trace file. Embodiments can therefore reduce storage requirements needed to store and/or replay traces, increase the speed with which traces can be written to and/or read from a storage device, reduce an amount of operating memory needed to store and/or replay traces, and reduce communications bandwidth needed to communications bandwidth needed to communicate trace files, among other things.

A first embodiment includes methods, systems, and computer program products for reducing the amount of storage resources occupied when storing a memory value on a storage device. The first embodiment includes identifying a plurality of bits of the memory value, and identifying a plurality of groups of bits from the plurality of bits of the memory value. Each group of bits comprises a different subset of two or more consecutive bits of the plurality of bits of the memory value. The first embodiment also includes, for each of the plurality of groups of bits, determining whether or not the group's corresponding subset of consecutive bits have a defined pattern. This includes determining that the plurality of groups of bits include one or more of (i) one or more first groups of bits each comprises a corresponding subset of consecutive bits that each have the defined pattern, or (ii) one or more second groups of bits each comprises a corresponding subset of consecutive bits that do not each have the defined pattern.

The first embodiment also includes recording, on the storage device, a plurality of flag bits comprising at least one flag bits corresponding to each group. The recording the bit flags includes (i) for each first group of bits, recording the at least one flag bit that corresponds to the group as being set, and (ii) for each second group of bits, recording the at least one flag bit that corresponds to the group as being cleared. The first embodiment also includes recording, on the storage device, only a portion of the bits of the memory value. Recording the portion of the plurality of bits of the memory value includes (i) for each first group of bits, refraining from recording at least a portion of the group's corresponding subset of consecutive bits on the storage device to reduce the amount of storage resources occupied when storing the memory value, and (ii) for each second group of bits, recording the group's corresponding subset of consecutive bits on the storage device.

A second embodiment includes methods, systems, and computer program products for reducing an amount of storage resources occupied when storing memory addresses on a storage device. The second embodiment includes recording a first group of high bits of a first memory address on the storage device and then, subsequent to recording the first group of high bits on the storage device, determining that a second memory address is to be recorded on the storage device. Second embodiment also includes identifying that a first value of the first group of high bits recorded on the storage device equals a second value of a second group of high bits of the second memory address that is to be recorded on the storage device. Then, based at least on identifying that the first value equals the second value, the second embodiment includes recording a group of low bits of the second memory address on the storage device, while refraining from recording the second group of high bits on the storage device.

A third embodiment generally combines the first and second embodiments, and includes methods, systems, and computer program products for reducing an amount of storage resources occupied when recording a memory address and a memory value. The third embodiment includes identifying a memory address and a corresponding memory value that are to be recorded onto a storage device, and recording both the memory address and the memory value onto the storage device. Recording the memory address includes identifying a first subset of high bits of the memory address, determining that a first value of the first subset of high bits equals a second value of a group of high bits that has already been recorded onto the storage device, recording a second subset of low bits of the memory address onto the storage device, while refraining from recording the first subset of high bits onto the storage device, and setting one or more first flag bits to indicate that only the second subset of low bits were recorded onto the storage device. Recording the memory value includes identifying a plurality of groups of consecutive bits of the memory value, determining that a first group of the plurality of groups of consecutive bits contains bits having a defined pattern, and that a second group of the plurality of groups of consecutive bits contains bits lacking the defined pattern, recording the second group of consecutive bits to the storage device, while refraining from recording at least a portion of the first group of consecutive bits to the storage device, and setting one or more second flag bits to indicate that the first group of consecutive bits have the same value and was not recorded.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5C illustrates an example of use of compression flag bits to omit recording groups of value bits;

DETAILED DESCRIPTION

At least some embodiments described herein relate to reducing the amount of storage and/or memory resources needed to represent memory addresses and/or memory values in a trace file. Embodiments can therefore reduce storage requirements needed to store and/or replay traces, increase the speed with which traces can be written to and/or read from a storage device, reduce an amount of operating memory needed to store and/or replay traces, and reduce communications bandwidth needed to communicate trace files, among other things.

Figure 1:
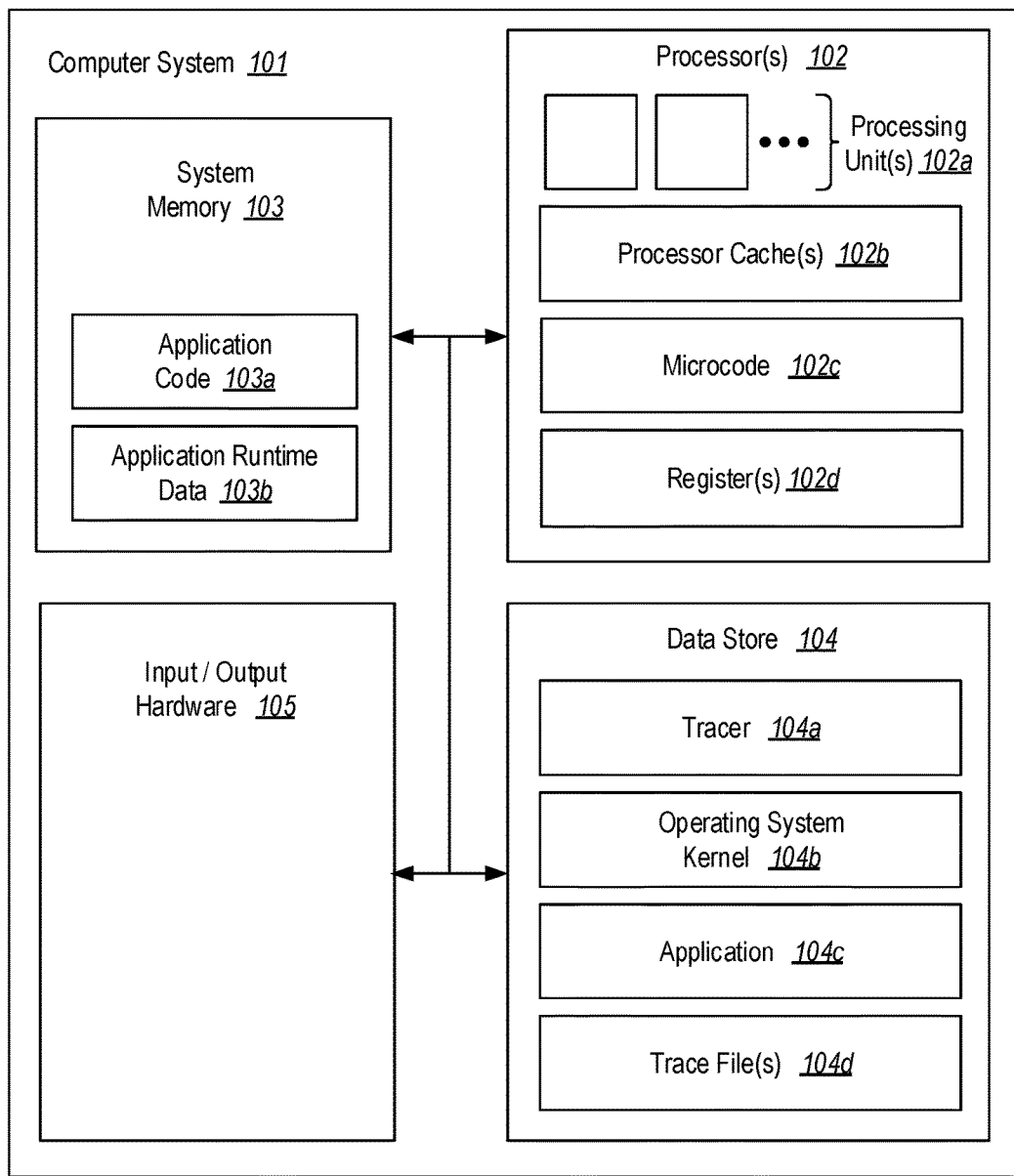
FIG. 1 illustrates an example computing environment that facilitates recording a trace file of program execution using a shared processor cache.

Initially, FIG. 1 illustrates an example operating environment in which the embodiments of memory address and memory value storage, compression, encoding, etc. discussed herein may operate. In particular FIG. 1 illustrates an example computing environment 100 that facilitates recording a trace file of program execution using a shared processor cache. As depicted, embodiments may comprise or utilize a special-purpose or general-purpose computer system 101 that includes computer hardware, such as, for example, one or more processors 102, system memory 103, one or more data stores 104, and/or input/output hardware 105.

Embodiments within the scope of the present invention include physical and other computer-readable media for carrying or storing computer-executable instructions and/or data structures. Such computer-readable media can be any available media that can be accessed by the computer system 101. Computer-readable media that store computer-executable instructions and/or data structures are computer storage devices. Computer-readable media that carry computer-executable instructions and/or data structures are transmission media. Thus, by way of example, and not limitation, embodiments of the invention can comprise at least two distinctly different kinds of computer-readable media: computer storage devices and transmission media.

Computer storage devices are physical hardware devices that store computer-executable instructions and/or data structures. Computer storage devices include various computer hardware, such as RAM, ROM, EEPROM, solid state drives ("SSDs"), flash memory, phase-change memory ("PCM"), optical disk storage, magnetic disk storage or other magnetic storage devices, or any other hardware device(s) which can be used to store program code in the form of computer-executable instructions or data structures, and which can be accessed and executed by the computer system 101 to implement the disclosed functionality of the invention. Thus, for example, computer storage devices may include the depicted system memory 103, the depicted data store 104 which can store computer-executable instructions and/or data structures, or other storage such as on-processor storage, as discussed later.

Transmission media can include a network and/or data links which can be used to carry program code in the form of computer-executable instructions or data structures, and which can be accessed by the computer system 101. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media. For example, the input/output hardware 105 may comprise hardware (e.g., a network interface module (e.g., a "NIC")) that connects a network and/or data link which can be used to carry program code in the form of computer-executable instructions or data structures.

Further, upon reaching various computer system components, program code in the form of computer-executable instructions or data structures can be transferred automatically from transmission media to computer storage devices (or vice versa). For example, computer-executable instructions or data structures received over a network or data link can be buffered in RAM within a NIC (e.g., input/output hardware 105), and then eventually transferred to the system memory 103 and/or to less volatile computer storage devices (e.g., data store 104) at the computer system 101. Thus, it should be understood that computer storage devices can be included in computer system components that also (or even primarily) utilize transmission media.

Computer-executable instructions comprise, for example, instructions and data which, when executed at the processor(s) 102, cause the computer system 101 to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

As illustrated, the data store 104 can store computer-executable instructions and/or data structures representing application programs such as, for example, a tracer 104a, an operating system kernel 104b, and application 104c (e.g., the application that is the subject of tracing by the tracer 104a, and one or more trace file(s) 104d). When these programs are executing (e.g., using the processor(s) 102), the system memory 103 can store corresponding runtime data, such as runtime data structures, computer-executable instructions, etc. Thus, FIG. 1 illustrates the system memory 103 as including time application code 103a and application runtime data 103b (e.g., each corresponding with application 104c).

The tracer 104a is usable to trace execution of an application, such as application 104c, and to store trace data in the trace file 104d. In some embodiments, the tracer 104a is a standalone application, while in other embodiments the tracer 104a is integrated into another software component, such as the operating system kernel 104b, a hypervisor, etc. While the trace file 104d is depicted as being stored in the data store 104, the trace file 104d may also be recorded exclusively or temporarily in the system memory 103, or at some other storage device.

FIG. 1 includes a simplified representation of the internal hardware components of the processor 102. As illustrated, each processor 102 includes one or more processing units 102a. Each processing unit may be physical (i.e., a physical processor core) and/or logical (i.e., a logical core presented by a physical core that supports hyper-threading, in which more than one application thread executes at the physical core). Thus, for example, even though the processor 102 may in some embodiments include only a single physical processing unit (core), it could include two or more processing units 102a presented by that single physical processing unit.

Each processing unit 102a executes processor instructions that are defined by applications (e.g., tracer 104a, operating kernel 104b, application 104c, etc.), and which instructions are selected from among a predefined processor instruction set architecture. The particular instruction set architecture of each processor 102 varies based on processor manufacturer and processor model. Common instruction set architectures include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other instruction set architectures exist and can be used by the present invention. In general, an "instruction" is the smallest externally-visible (i.e., external to the processor) unit of code that is executable by a processor.

The processing unit(s) 102a obtain processor instructions from one or more processor cache(s) 102b (i.e., a private cache used by a single processing unit, or a shared cache shared by a plurality of processing units), and execute the processor instructions based on data in the processors cache(s) 102a, based on data in registers 102d, and/or without input data. In general, a processor cache 102b is a small amount (i.e., small relative to the typical amount of system memory 103) of random-access memory that stores on-processor copies of portions of the system memory 103. For example, when executing the application code 103a, the processor cache(s) 102b contain portions of the application runtime data 103b. If the processing unit(s) 102a require data not already stored in the processor cache(s) 102b, then a "cache miss" occurs, and that data is fetched from the system memory 103 (potentially evicting some other data from the processor cache(s) 102b). The registers 102d are hardware based storage locations that are defined based on the instruction set architecture of the processors(s) 102.

The processor cache(s) 102b may include a code cache portion and a data cache portion (not depicted). For example, when executing the application code 103a, a code cache stores at least a portion of the processor instructions stored in the application code 103a and a data cache stores at least a portion of data structures of the application runtime data 103b. Often times, a processor cache is divided into separate tiers/layers (e.g., layer 1 ("L1"), layer 2 ("L2"), layer 3 ("L3"), etc.), with some tiers (e.g., L3) potentially existing separate from the processor 102. Thus, the processor cache(s) 102b may comprise one of these layers (e.g., L1), or may comprise a plurality of these layers.

Each processing unit 102 also includes microcode 102c, which comprises control logic (i.e., executable instructions) that control operation of the processor 102, and which generally functions as an interpreter between the hardware of the processor and the processor instruction set architecture exposed by the processor 102 to executing applications. The microcode 102 may be embodied on on-processor storage, such as ROM, EEPROM, etc.

Figure 2:
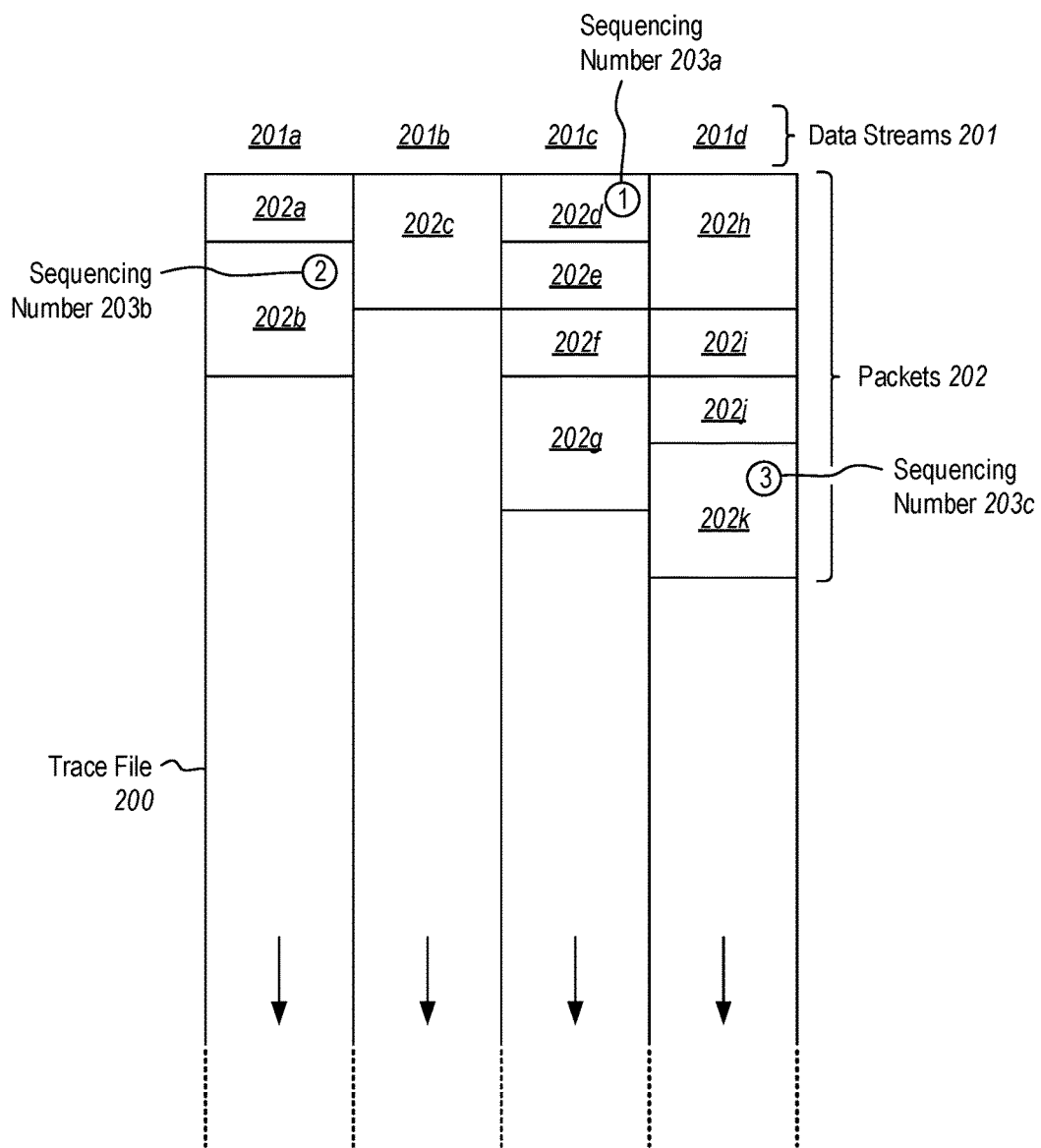
FIG. 2 illustrates an example trace file.

FIG. 2 illustrates an example trace file 200 (e.g., such as one corresponding to trace file 104d of FIG. 1). During execution of an application (e.g., application 104c), the tracer 104a can maintain a separate data stream 201 in the trace file 200 for each processing unit 102a (i.e., for each thread). The example trace file 200 includes four data streams 201a-201d (and thus would correspond to four processing units executing four different threads), but the trace file 200 could include any number of data streams 201 depending on a number of processing units 102a available at the computer system 101 (whether they be in a single processor 102 or multiple processors 102) and/or a number of threads utilized by the application 104c.

The data steams 201 may be included in a single file, or may each be stored in different files. Each data stream 201 includes data packets 202 storing trace data that is usable to reproduce execution of the corresponding thread. As depicted, individual packets 202 may be of differing sizes, depending on trace file implementation and on the particular information stored. In the depicted example, data stream 201a for a first processing unit/thread has logged packets 202a and 202b, data stream 201b for a second processing unit/thread has logged packet 202c, data stream 201c for a third processing unit/thread has logged packets 202d-202g, and data stream 201d for a fourth processing unit/thread has logged packets 202h-202k.

In general, each data stream 201 is recorded for a processing unit/thread independently, such that the timing of the events recorded by data packets in one data stream is generally independent from the timing of the events recorded by data packets in another data stream. However, in some embodiments, the trace file 200 stores sequencing events that record the execution sequence of certain "orderable" events across the threads. For example, FIG. 2 also illustrates that packet 202d of data stream 201c includes a first sequencing number 203a, packet 202b of data stream 201a includes a second sequencing number 203b, and packet 202k of data stream 201d includes a third sequencing number 203c. Thus, using the sequencing numbers 203a-203c, it is known that an orderable event recorded in packet 202d on data stream 201c occurred prior to an orderable event recorded in packet 202b on data stream 201a, and that the orderable event recorded in packet 202b on data stream 201a occurred prior to an orderable event recorded in packet 202k on data stream 201d.

Embodiments may utilize as the sequencing number a monotonically incrementing number ("MIN"), which is guaranteed not to repeat. Orderable events may be defined according to a "trace memory model," which is used to identify how to store (e.g., in a trace) interactions across threads (e.g., based on how the threads interact through shared memory, their shared use of data in the shared memory, etc.). Depending on implementation, a trace memory model may be weaker or stronger than a memory model used by the processor 102. The trace memory model used may be a memory model defined by a programming language used to compile code (e.g., C++14), or some other memory model defined for purposes of tracing.

Some implementations of application tracing observe execution of each thread of an application, and may record in the trace file 104d, for each thread, one or more of (i) initial state of a thread's execution (e.g., processor registers 102d), (ii) the side effects of certain instructions, such as "non-deterministic" instructions (i.e., those instructions that do not produce fully predictable outputs because their outputs are not fully determined by data in processor general registers or memory) and/or un-cached reads by recording values of the processor registers 102d and/or memory values that were changed by execution of the instruction, or (iii) the memory values that instructions in the thread consumed. Using this data, and using the actual code of the application being traced, a full reproduction of application execution can be reproduced.

As part of recording the memory values that instructions in the thread consumed, some embodiments of the tracer 104a may record both (i) the memory address from which the value was read, and (ii) the actual value stored at that address. In some embodiments, the tracer 104a records memory addresses/values based on an observation of code execution, including values in the code instructions themselves and the values of processor registers 102d.

In additional or alternative embodiments, the tracer 104a records memory addresses/values based on the processor cache(s) 102b. In these embodiments, the tracer 104a records into the trace file(s) 104d data that is brought in the processor's 102's processor cache(s) 102b (e.g., as part of a cache miss), and that is actually consumed by a processing unit as it executes a thread.

Figure 3:
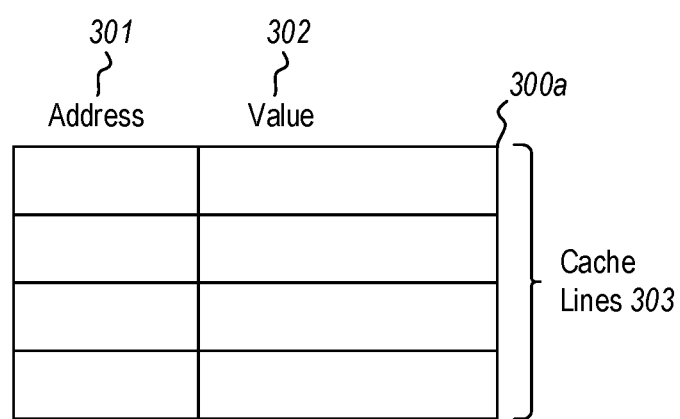
FIG. 3 illustrates an example conventional shared cache.

FIGS. 3 illustrates a simplified logical view of a conventional processor cache 300a. As depicted, the conventional cache 300a includes a plurality of cache lines 303, each of which includes an address portion 301 and a value portion 302. The address portion 301 stores a physical and/or virtual address of a location in the system memory 103, while the value portion 302 stores a copy of the data at that location in the system memory 103. While, for simplicity in illustration, only four cache lines 303 are depicted, one of ordinary skill in the art will recognize that an actual processor cache would likely have many more cache lines. For example, a contemporary INTEL processor may contain a L1 cache comprising 512 cache lines. In this cache, each cache line may be usable to store a 64 byte (512 bit) value in reference to an 8 byte (64 bit) memory address (i.e., a physical or virtual address in the system memory 103).

Figure 4A:
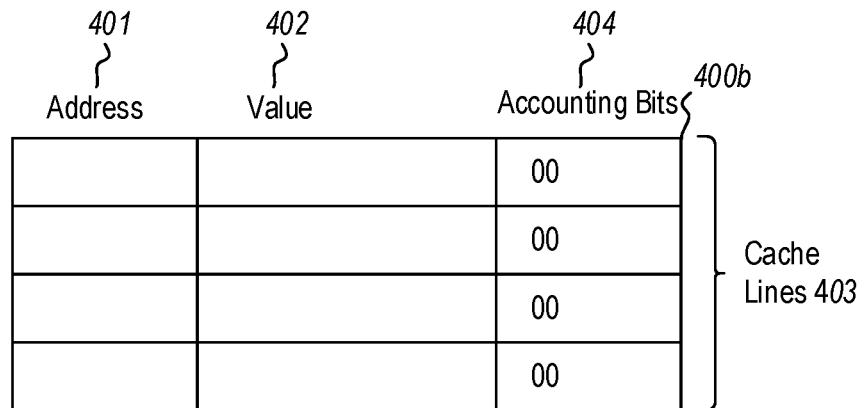
FIG. 4A illustrates an example shared cache that extends each cache line with additional accounting bits.
Figure 4B:
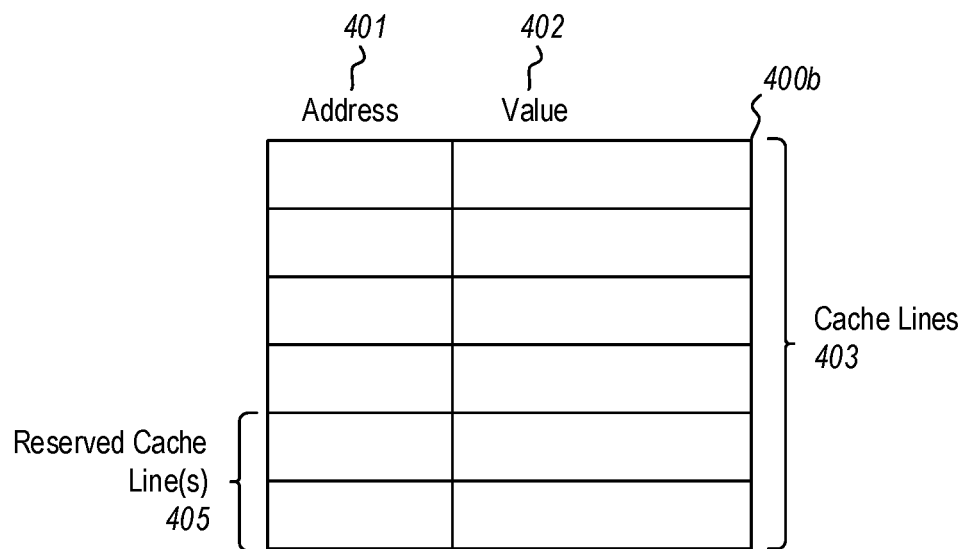
FIG. 4B illustrates an example shared cache that stores accounting bits in reserved cache lines.

FIGS. 4A and 4B illustrate some alternative caches that may by usable assist in storing a trace of program execution. FIG. 4A illustrates an example cache 400a that extends each cache line 403 with an additional accounting bit(s) portion 404. FIG. 3B illustrates an embodiment of a cache 400b that stores accounting bits in reserved cache lines 405. Some embodiments extend the processor's hardware-implemented logic and/or the processor's microcode 102c to utilize the accounting bits to track whether or not the current value in the cache line has been logged (i.e., in the trace file 104d) on behalf of a processing unit/thread. These accounting bits are then usable, for example, to determine whether the current values of the address portion 401 and the value portion 402 of a cache line should be logged in the trace file 104. For example, in cache 400a each cache line includes corresponding accounting bits that are used to track whether or not the current value in the cache line has been logged. FIG. 4B illustrates an example cache 400b that stores accounting bits in reserved cache lines 405. Thus, in cache 400b, each reserved cache line 405 includes accounting bits for one or more corresponding regular cache lines. For example, a single cache line could be used to track whether or not the current values in each of a plurality of cache lines have been logged.

In accordance with the foregoing environments, embodiments herein include a plurality of techniques for encoding memory addresses and memory values on a code execution trace file 200. These techniques leverage unique knowledge of program execution in order to reduce an amount of storage required in the trace file(s) 104d to store memory addresses and/or values. These techniques may involve compression/encoding techniques that reduce the number of bits it takes to store a given value, and reduction techniques that leverage knowledge of program execution to omit storing portions of data altogether.

Not only can embodiments of the techniques described herein reduce the amount of storage required in the trace file(s) 104d when tracing program execution, these techniques also increase the speed with which the trace file(s) 104d are written (e.g., because fewer bits are being written to the trace file(s) 104d than would be the case if memory addresses and/or values were stored in their entirety), and increase the speed with which a trace file(s) 104d are read during replay (e.g., because fewer bits need to be read from the trace file(s) 104d). Additionally, embodiments of the techniques described herein reduce an amount of system memory 103 required for tracing and/or replay, since less runtime memory to be used to read from and/or write to the trace file(s) 104d. Additionally, embodiments of the techniques described herein reduce the amount of traffic on various communications media (e.g., system busses, network links, etc.). to communicate data as is read from and/or written to the trace file 200.

In some embodiments, techniques for encoding memory addresses and memory values on code execution trace file(s) 104d (such as trace file 200) are achieved based on the observation that (i) a trace packet 202 generally needs not include all the bits of the address (as is discussed in detail in connection with FIGS. 7 and 8), and (ii) many memory values include a significant portion of bits having the same pattern (e.g., consecutive ones, consecutive zeros, etc.). As such, compression of the memory value can be achieved by using some of the bits that would normally need to be used to store a full uncompressed memory address, to indicate whether groups of bits in the memory value all have the same pattern, and refraining from storing those groups of bits (in whole and/or in part).

Figure 5A:
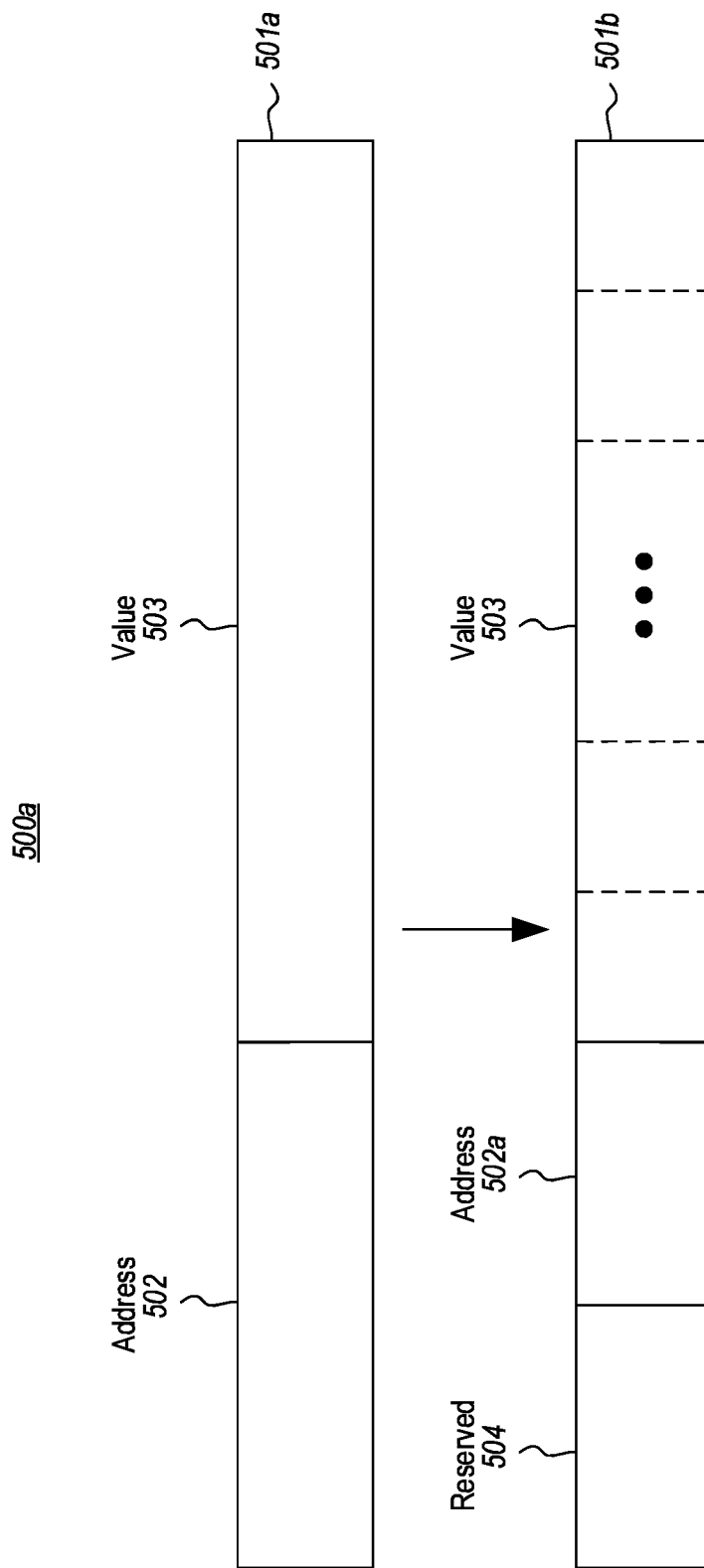
FIG. 5A illustrates an example for reducing a number of bits needed to store a memory address and a memory value in a trace file.

For example, FIG. 5A depicts an example 500a for reducing a number of bits needed to store a memory address and a memory value in a trace file. FIG. 5A depicts an example layout 501a of bits that could be stored uncompressed on a trace file to record a full cache line (i.e., full memory address and full memory value). The layout 501a includes divisions for address bits 502 (i.e., for storing the memory address) and value bits 503 (i.e., for storing the memory value). In accordance with some at least one encoding technique, FIG. 5A also depicts an example layout 501b of bits that could be used as the basis of reducing the number of bits used. In the example, layout 501b depicts that some reserved bits 504 are allocated from the address bits, resulting in a reduced number of address bits 502a that are available to store the memory address (techniques for doing so are discussed later). Also, in order to reduce the number of bits used to store the memory value, the value bits 503 are logically grouped into a plurality of groups of bits. The particular numbers of bits represented, and their groupings, are not illustrated in example 500a, since they will vary based on processor architecture and/or implementation choices.

Figure 5B:
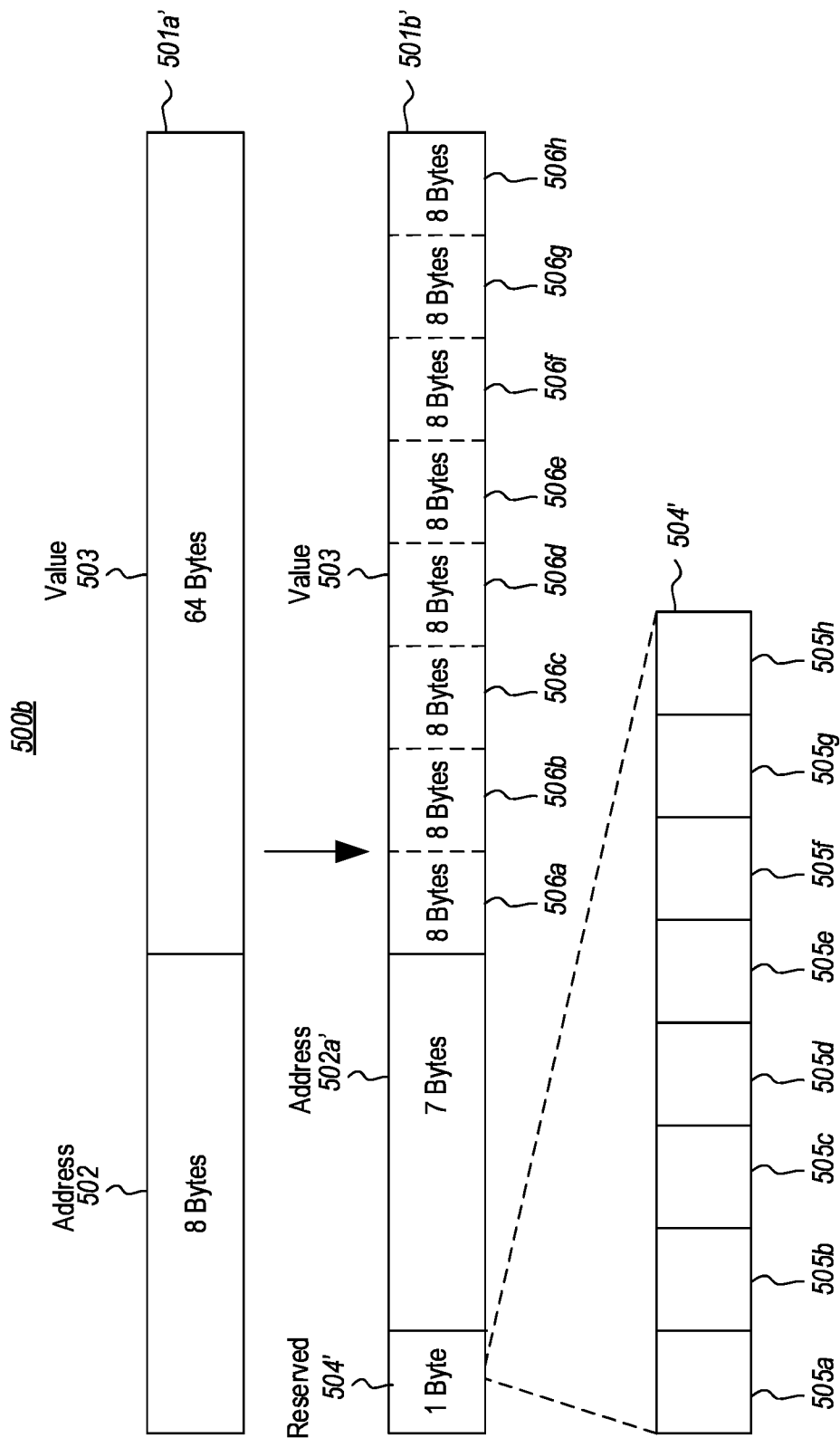
FIG. 5B illustrates a concrete example of a layout of FIG. 5A.

FIG. 5B, however, illustrates a concrete example 500b of a possible bit layout of the layout 501b of FIG. 5A. In FIG. 5B, layout 501a' could represent 72 bytes (576 bits), including 8 bytes (64 bits) for storing the memory address (i.e., address bits 502), and 64 bytes (512 bits) for storing the memory value (i.e., value bits 503). Then, layout 501b still represents 72 bytes (576 bits), but uses one byte (8 bits) for reserved bits 504', uses seven bytes (56 bits) for address bits 502a', and uses 64 bytes (512 bits) for value bits 503. In this example, the 64 bytes of the value bits 503 are grouped into eight groups 506a-506h of eight bytes each, though other groupings could be used based on implementation. For example, other implementations could use four groups of sixteen bytes, sixteen groups of four bytes, etc.

One or more of the reserved bits 504' are used as compression flags (505a-505h) that, when set, indicate that a corresponding group of consecutive bytes (i.e., 506a-506h) in the value have a defined pattern (e.g., all ones, all zeros, etc.), and are therefore not stored on the trace file 104d. If there were to be a different number of groupings (e.g., four or sixteen, as mentioned above), then there would be a corresponding different number of reserved bits allocated for use as compression flags.

Thus, if the first compression flag 505a is set (e.g., to a one) it may indicate that its corresponding group 506a (i.e., the first "high" group of eight bytes) of the value follow a defined pattern (e.g., all ones, all zeros, etc.), and that these bytes are therefore not stored on the trace file 104d. In this way, the number of bits used to represent the value can be greatly reduced, particularly if there are large number of consecutive bits in the value bits 503 having defined patterns.

Although examples of patterns of all ones or all zeros have been given, there are many other possible patterns of ones and zeros, such as alternating ones and zeros, alternating bytes that are all ones and all zeros, etc. One particular example involves memory values that encode Unicode strings. In such encodings, it is common for every even (or odd, depending on the endianness of the processor 102) position of eight bytes to be all zeros. This often happens because Unicode strings containing western characters (especially English ones) are encoded using two bytes per character (e.g., using UTF-16), with one of the bytes being always zero. Thus, the compression flag can be used to signal that a group of bits follows this pattern and, that at least a portion of its bits (e.g., the positions of bytes that are zeros) are not stored.

FIG. 5C illustrates and example 500c of use of compression flag bits to omit recording groups of value bits. For example, in layout 501c the first four groups of bytes (i.e., groups 506a-506d) have the same pattern of bits having the same value (e.g., all ones or all zeros). Thus, the reserved bits 504' are shown as being "11110000," and the value bits 503' are shown as only including groups 506e-506h. Groups 506a-506d have been omitted from the trace file(s) 104d, since their corresponding compression flags (i.e., 505a-505d) have been set, and since they can be reproduced later (i.e., as all ones or as all zeros, depending on implementation) based on these flags.

By way of an even more concrete example, suppose that a 64 byte representation of the number one (i.e., hexadecimal 0x000 . . . 001, with the ellipses representing 122 zeros) read from the eight byte memory address 0x000 . . . 0FF (with the ellipses representing ten zeros) were to be compressed using the foregoing techniques. This could be represented on the trace as follows, reserved bits (one byte): 11111110 (0xFE)

address bits (seven bytes): 0x0 . . . 0FF (the ellipses representing ten zeros)

value bits (eight bytes): 0x000 . . . 001 (the ellipses representing ten zeros), to result in: 0xFE0 . . . 0FF000 . . . 001 (each ellipses representing ten zeros) for a total of sixteen bytes (versus 72 bytes for the uncompressed value).

Figure 5D:
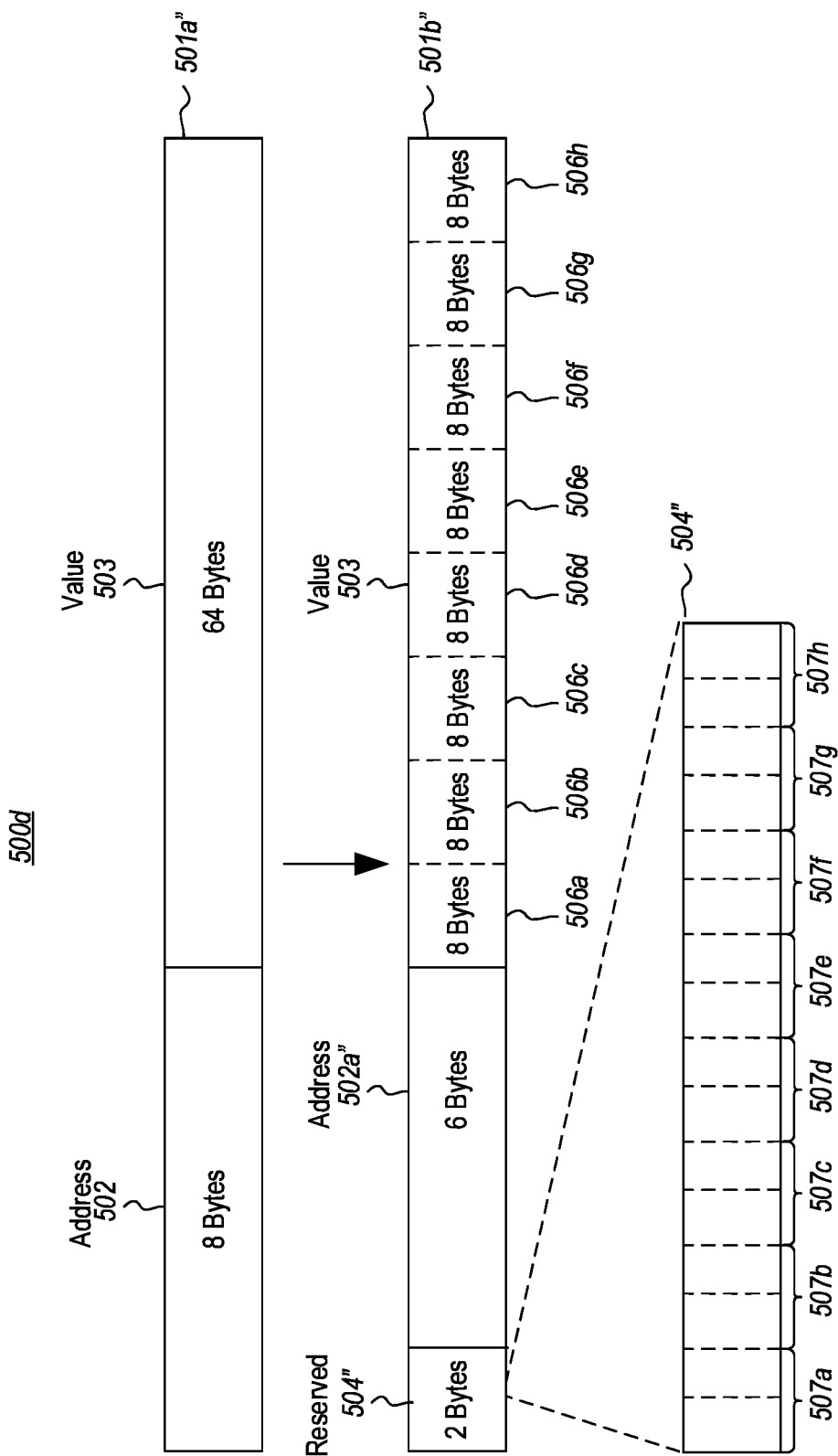
FIG. 5D illustrates an example of compressing a memory value in a trace file using two flag bits for each group of value bits.
Figure 6:
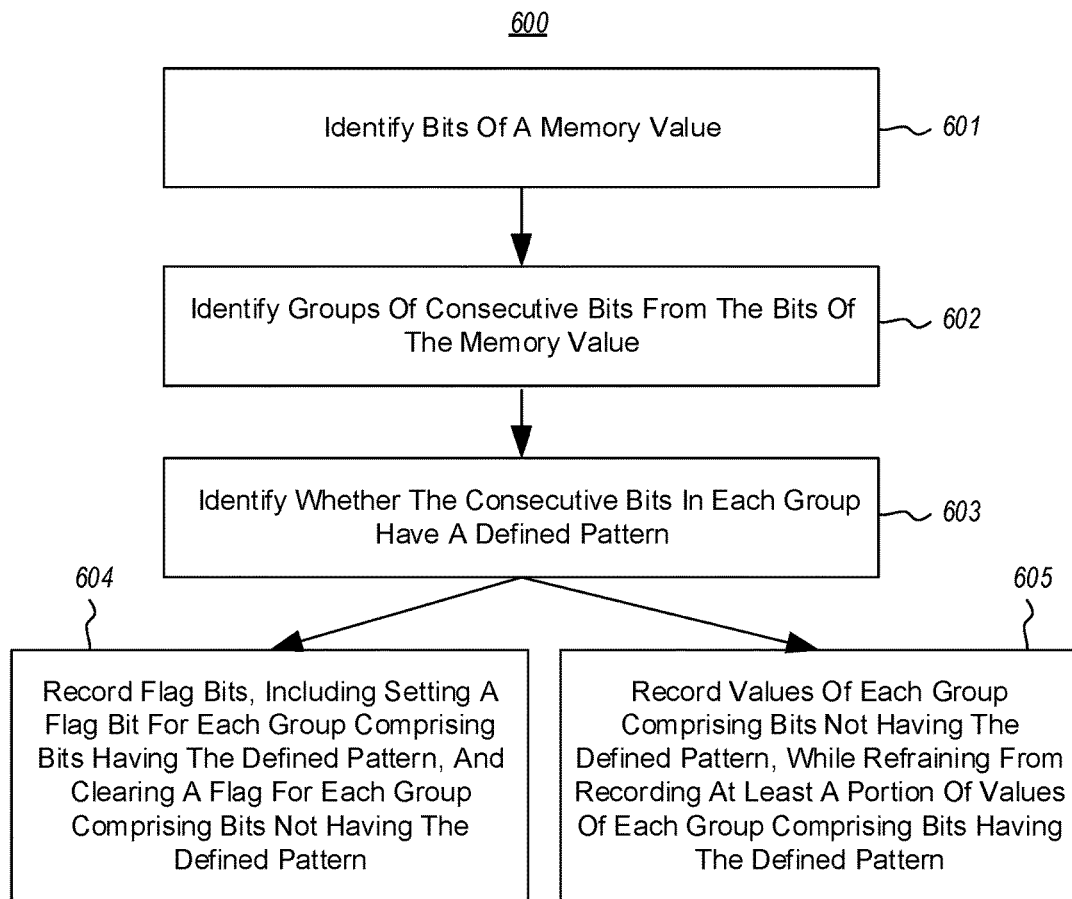
FIG. 6 illustrates a flowchart of an example method for reducing an amount of storage resources occupied when storing a memory value on a storage device.

Other implementations that further refine the foregoing technique are also possible. For example, FIG. 5D illustrates another example 500d that reserves two bytes (sixteen bits) for reserved bits 504" (i.e., such that address bits 502a" now include six bytes). As depicted, the reserved bits 504" are divided into groupings 507a-507h that have two compression flag bits each. Thus, each grouping 507a-507h of compression flags still corresponds to a group of consecutive bytes (i.e., 506a-506h). While one of the compression flag bits in each group is used to indicate whether a corresponding group of bits in the value bits 503 have the same value, the other bit can be used for other purposes.

In one example embodiment the other bit is used to indicate which pattern is being represented for the corresponding group (e.g., set if the value of each bit in the corresponding group of consecutive bits is a one or cleared if they are zeros, or set if the bits in the corresponding group adhere to a first pattern such as the Unicode pattern described above or cleared if they are as second pattern such as all zeros). For example, the bit could be set to a one if the corresponding group of consecutive bits are all ones, or could be set to a zero if the corresponding group of consecutive bits are all zeros. Thus, in this embodiment, as single set of reserved bits 504" could be used to concurrently represent both groupings of consecutive ones in the value bits 503, as well as groupings of consecutive zeros in the value bits 503.

In another example embodiment, the other bit is used to indicate how many bits are in the corresponding group of consecutive bits. For example, the bit could be set to a one if the corresponding group of consecutive bits is eight bytes, or could be set to a zero if the corresponding group of consecutive bits is four bytes. Thus, in this embodiment, as single set of reserved bits 504" could be used to concurrently represent different sized groupings of consecutive bits. In this embodiment, there may be one or more additional reserved bits 504" that are used to indicate how many groupings are being represented.

Combinations of each of the foregoing are also possible. For example, there could be three or more reserved compression flag bits for each grouping, to indicate both a size and a value (e.g., all ones, all zeros, a particular pattern, etc.) of the grouping, or two reserved bits could be used to indicate a more than two patterns of bits. For example, given the example 500d of FIG. 5D in which each of groupings 506a-506h have two corresponding bits in the reserved bits 504" (i.e., sixteen bits), one embodiment could implement the reserved bits as follows: a "00" means the corresponding grouping does not match any pattern, "01" means that corresponding grouping is all zeros, "10" means all the odd bytes are zero, and "11" means that the corresponding grouping is all ones.

As a further optimization to the preceding example, rather than signaling which pattern is being represented on a group-by-group basis (e.g., using two bits per group), there could be one or more bits reserved to indicate what pattern is being signaled, along with a single bit for each group to indicate whether or not the group comprises the indicated pattern. Thus, for example, rather than using sixteen reserved bits as in the preceding example, ten reserved bits could be used, with two bits to indicate what pattern is being signaled, and eight bits (one for each group) to indicate whether the corresponding group comprises that pattern.

In view of the examples of FIGS. 5A-5D, FIG. 6 illustrates an example of a method 600 for reducing an amount of storage resources occupied when storing a memory value on a storage device. As illustrated, method 600 includes and act 601 of identifying bits of a memory value. For example, the tracer 104a may identify that a memory address and memory value are to be recorded to the trace file(s) 104d, and that that value includes a plurality of value bits 503. In some embodiments, the trace file(s) 104d may be formatted according to trace file 200, and the memory address and memory value may be recordable as part of a packet 202 in a data stream 201, based on execution of application 104c.

Method 600 also includes an act 602 of identifying groups of consecutive bits from the bits of the memory value. Act 602 can comprise identifying a plurality of groups of bits from the plurality of bits of the memory value, each group of bits comprising a different subset of two or more consecutive bits of the plurality of bits of the memory value. For example, the tracer 104a may identify that the value bits 503 are dividable into a plurality of groups 506a-506h of consecutive bits. The particular number of groups and number of bits in each group may vary based on implementation.

Method 600 also includes an act 603 of identifying whether the consecutive bits in each group have a defined pattern. Act 603 can comprise, for each of the plurality of groups of bits, determining whether or not the group's corresponding subset of consecutive bits have a defined pattern, including determining that the plurality of groups of bits include one more of (i) one or more first groups of bits that each comprises a corresponding subset of consecutive bits that have the defined pattern, or (ii) one or more second groups of bits that each comprises a corresponding subset of consecutive bits that do not each have the defined pattern. In a first example in accordance with example 501c, the tracer 104a may determine that the bits in each of groups 506a-506d have the same value (e.g., all ones or all zeros, depending on implementation), and that the all the bits in each of groups 506e-506h do not have the same values (i.e., each group contains a mixture of ones and zeros). In a second example, the tracer 104a may determine that the bits in one or more groups follow a defined pattern, such as alternating positions of bytes being all zeros (e.g., because they encode a Unicode string). Of course, the tracer 104a may determine that all the groups follow a defined pattern, or that none of the groups follow a defined pattern.

Method 600 also includes an act 604 of recording flag bits, including setting a flag bit for each group comprising bits having the defined pattern, and clearing a flag for each group comprising bits not having the defined pattern. Act 604 can comprise recording, on a storage device, a plurality of flag bits comprising at least one flag bits corresponding to each group, including (i) for each first group of bits, recording the at least one flag bit that corresponds to the group as being set, and (ii) for each second group of bits, recording the at least one flag bit that corresponds to the group as being cleared. In the first example, the tracer 104a may record the reserved bits 504' as "11110000," to indicate that the bits in each of groups 506a-506d have the same value, and that the all the bits in each of groups 506e-506h do not have the same values. In the second example, the tracer 104 could set one or more of the reserved bits 504 to indicate that a corresponding group follows a defined pattern, such as alternating positions of bytes being all zeros. If the tracer 104a determined that all the groups follow the defined pattern, then the tracer 104a may set all of the flag bits; conversely, if the tracer 104a determined that none the groups follow the defined pattern, then the tracer 104a may clear all of the flag bits. The tracer 104a could record a flag bit as being set by recording a one, and flag bit as being cleared by recording a zero, though the opposite could also be true.

Method 600 also includes an act 605 of recording values of each group comprising bits not having the defined pattern, while refraining from recording at least a portion of values of each group comprising bits having the defined pattern. Act 605 can comprise recording, on the storage device, only a portion of the plurality of bits of the memory value, including (i) for each first group of bits, refraining from recording at least a portion of the group's corresponding subset of consecutive bits on the storage device to reduce the amount of storage resources occupied when storing the memory value, and (ii) for each second group of bits, recording the group's corresponding subset of consecutive bits on the storage device. In the first example, the tracer 104a may record the bits each of groups 506e-506h which do not have the same values, while refraining from recording the bits for groups 506*a*-506*d*. As such, the tracer has used one byte of reserved bits 504' to avoid recording 32 bytes of value bits 503 in the trace file 104*d*, resulting in significant space savings. In the second example, the tracer may record the entirety of groups of bits that do not follow the defined pattern, and refrain from recording portions of the groups of bits that follow the defined pattern (e.g., refraining from recording the alternating positions of bytes that are all zeros). If the tracer 104*a* determined that all the groups follow the defined pattern, then (depending on the pattern) the tracer 104*a* may be able to record no value bits; conversely, if the tracer 104*a* determined that none the groups follow the defined pattern, then the tracer 104*a* record all of the value bits.

As depicted, acts 604 and 605 may be performed in any order relative to one another, including being performed in parallel. Also, as discussed above, the plurality of flag bits could comprise two or more flag bits corresponding to at least one group of bits. In this example, at least one flag bit could indicate whether the value of each bit in the subset of consecutive bits corresponding to the at least one group of bits is a one or a zero. In another example, at least one flag bit could indicate a number of bits in the subset of consecutive bits corresponding to the at least one group. Combinations of the foregoing are also possible.

In addition to the foregoing techniques for compressing memory values in a trace file, embodiments also include techniques for reducing the number of bits needed to store a memory address. Initially, a reduction in the number of bits needed to store a memory address can be achieved with a realization that much of real hardware does not actually implement all of its address bits. For example, most contemporary 64-bit computing hardware does not actually implement use all 64 address bits, and rather implements, for example, 56 bits. Thus, for these systems, it is relatively straightforward to reserve one byte of the address bits 502 for the reserved bits 504', even before applying any of the memory address compression techniques discussed below. Additionally, if the data being recorded (e.g., 501*a*) is known to be aligned (e.g., 64 bytes at an address multiple of 64, 32 bytes at an address multiple of 32, etc.), then the high "N" bytes (where N=log$_2$ of the number of bytes) of the address are known to be zero and can be removed from a data packet or be reserved for some other purpose.

Other memory address compression techniques are achieved through the observation that most memory reads by a thread are generally localized within certain regions of memory, and that space savings can be achieved when storing memory addresses on a trace file by using knowledge that the "high" bits in that memory region are always the same.

To illustrate, it is noted that each location in memory is addressable (at least logically) using a unique series of bits that increment through a range (e.g., starting at all zeros and ending at all ones). In the example of FIGS. 5B-5D, these are eight byte (64 bit) values. Thus, in this example, a first location in memory may be addressable as 0x0000000000000000, a second location may be addressable as 0x0000000000000001, a third location may be addressable as 0x0000000000000002, and so on until the last location of 0xFFFFFFFFFFFFFFFF (it is recognized that, due to implementation limitations, only a subset of these address locations may actually be accessible in actuality computing systems). Thus, in contiguous memory regions, only some of the "low" (e.g., farthest right) bits change when addressing individual locations in that memory region. For example, for a contiguous memory region containing the first 100 memory locations would occupy memory addresses 0x0000000000000000-0x0000000000000064. Thus, only the "low" two bytes of the memory address actually change when addressing any location in the memory region, and the "high" fourteen bytes stay the same.

Figure 7:
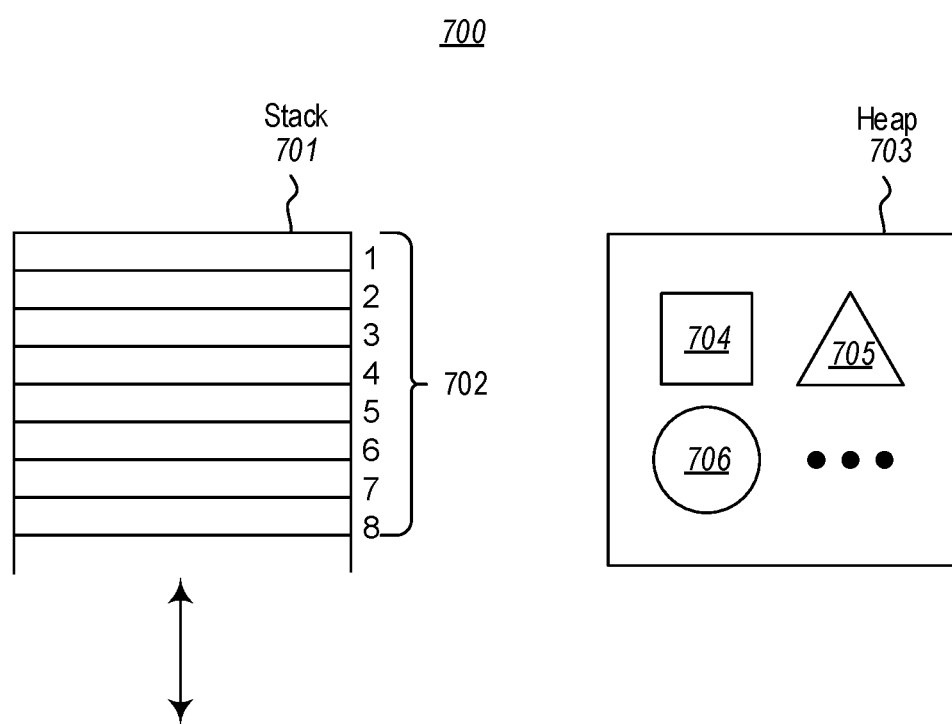
FIG. 7 illustrates common memory location accessed by a thread.

Threads very often access memory from contiguous memory regions. For example, FIG. 7 illustrates an example 700 of some common memory regions that are accessed by a thread. One of these memory regions is the thread's stack 701. As is recognized by one of ordinary skill in the art, a thread's stack 701 is a portion of memory allocated to a thread, and which functions as a last-in-first-out (LIFO) buffer for storing local variables, data associated with called functions, etc. Thus, as indicated by the double-ended arrow, a thread can store (i.e., "push") data on the stack and remove (i.e., "pop") data from the stack. As such, as depicted, the stack 701 includes a plurality of stack entries 702, each of which are identified by a localized range of memory addresses, which are represented generally as entries 1-8 in FIG. 7. Thus, as the thread "pushes" data onto the stack, and "pops" data off of the stack, the stack grows and shrinks through a contiguous range of memory addresses.

Other commonly-used memory regions come from memory known as the heap 703. As is recognized by one of ordinary skill in the art, the heap 703 is a portion of memory from which a thread can request memory allocations of particular sizes for use for general purposes, such as storing primitive data structures (e.g., arrays, linked lists, structs, variables, etc.), objects, etc. For example, FIG. 7 symbolically represents a plurality of memory allocations 704, 705, and 706 that are allocated to a thread. Each of these memory allocations 704, 705, and 706 may comprise contiguous ranges of memory addresses.

Thus, leveraging knowledge that a thread very often accesses contiguous ranges of memory addresses, the tracer 104*a* can avoid duplicating the "high" bits of memory addresses on the trace files(s) 104*d* when recording them to the trace file(s) 104*d*. For example, the tracer 104*a* may store the "high" bits in the trace file(s) 104*d* in connection with recording one memory address, and then omit those "high" bits when recording another memory address that shares the same "high" bits with the initial memory address. To illustrate, in the case of an eight byte (64 bit) memory address (discussed above), it may be that only the lowest four bytes (32 bits), or perhaps even the lowest two bytes (16 bits) or less, need be recorded in connection with recording some memory values. There are several manners in which this may be performed. In each one, the "high" bits of one or more memory addresses are noted somewhere in the trace file(s) 104*d*, such that only the "low" bits of one or more subsequent memory addresses need be recorded.

In a first embodiment, when new high bits of a memory address are encountered by a thread, that full memory address (including both the high bits and the low bits) are recorded in a trace packet in that thread's data stream. Then, the next time a memory address is to be stored on the thread's data stream, the high bits of this new memory address are compared to the high bits stored in the prior trace packet (that stores a memory address). If the high bits are the same, then they are omitted when storing the new memory address in the next trace packet—such only the low bits are stored. In some embodiments, one or more flag bits (e.g., allocated from reserved bits 504) are set in the initial trace packet to indicate that the high bits have been stored and/or one or more flag bits (e.g., allocated from reserved bits 504) are set in subsequent trace packet to indicate that the high bits have been omitted. This may continue for subsequent data packets until a new set of high bits are encountered, at which time these new high bits are stored and used as the basis for subsequent packets.

For example, referring to FIG. 2, if new high bits were to be encountered when storing a memory address in packet 202*h* of data stream 201*d*, then that full memory address (including both the high bits and the low bits) may be stored in packet 202*h*. One or more flag bits may also be set in packet 202*h* to indicate that it contains a full memory address. Then, if the same high bits are later encountered when storing a subsequent memory address in packet 202*i*, then only the low bits of that subsequent memory address may be stored in packet 202*i*. One or more flag bits may also be set in packet 202*i* to indicate that it does not contain the full memory address. Later, if the same high bits are again encountered when storing yet another memory address in packet 202*j*, then only the low bits of that memory address may be stored in packet 202*j* (and appropriate flag bits may be set in packet 202*j* to indicate that it does not contain the full memory address). Finally, if new high bits are encountered when storing a further memory address in packet 202*k*, then that full memory address (including the high bits and the low bits) may be stored in packet 202*k*, and that packet is used as the basis for a search of high bits for subsequent packets. Later, during replay, the flag bits and the stored high bits are usable to reconstruct each full memory address.

In a second embodiment, one or more "high" bit values are recorded in a reserved portion of trace file(s) 104*d* that may function as a lookup table. Then, when recording a memory address in a trace packet, the high bits of the memory address are compared to the recorded high bit value(s) in the lookup table. If one of the recorded high bit value matches, then only the low bits of the memory address are recorded in a trace packet, and the recorded high bit value is referenced (e.g., using one or more bits allocated from the reserved bits 504). Thus, for example, there may be a plurality of stored high bit values that are referenced by number (e.g., 1, 2, 3, 4, etc.), and when only the low bits of a memory address are recorded in a data packet the appropriate high bit value is referred to by number using one or more of the reserved bits 504.

To illustrate, if two bits were allocated from the reserved bits 504, they could reference up to four high bit values. By extension, three reserved bits could reference up to eight high bit values, and so forth. In some embodiments, the allocated reserved bits are given a zero value when no high bits are being referenced (i.e., because the full memory address is stored in the trace packet). In a simple example in which there is only one stored high bit value, a single reserved bit can be used to indicate whether or not the trace packet relies on the stored high value.

The second embodiment of storing a look up table of one or more high bit values is particularly useful for storing the high bits for memory access to a thread's stack 701 or to memory allocated to the thread from the heap 703. Thus, for example, one or more high bit values may correspond to the high bits in the memory addresses 702 for the thread's stack 701, and one or more other high bit values may correspond to different memory regions (e.g., 704-706) allocated from the heap 703. The particular manner for choosing which high bit values to store in the lookup table may vary based on implementation, but possible mechanisms may include storing the most frequently used high bit values, and storing the most recently used high bit values, randomly choosing which high bit values to store, etc.

The first and second embodiments may be combined as well. For example, one implementation may store the high bits for frequent accesses to the stack and heap in a lookup table in accordance with the second embodiment, while the high bits for other memory accesses are stored in trace packets in accordance with the first embodiment. Another implementation may store the most frequently encountered high bits in a lookup table in accordance with the second embodiment, and store other frequent high bits in trace packets in accordance with the first embodiment. The former implementation may evict high bit values from the lookup table as other high bit values being stored in trace packets become more frequent. In implementations in which there are sets of high bits stored for both the stack and the heap, some implementations may use one or more reserved bits to distinguish whether the referenced high bits apply to the stack (e.g., a stack lookup table), or whether they apply to the heap (e.g., a heap lookup table). However, these extra reserved bits may be omitted, in some embodiments, since some architectures enforce implicit or explicit restrictions how different instructions can access memory segments. Thus, type of access (e.g., to the stack or to the heap) may be inferred at replay based on the type of accessed caused by a read instruction.

Further optimizations may be used to reduce the number of bits needed to store memory address that are part of a thread's stack. In particular, it is generally known how much memory is allocated to each thread's stack. For example, in many environments, each thread is allocated one megabyte for its stack. Thus, all memory locations within the stack are generally addressable using only twenty bits. Based on this knowledge, when the tracer 104*a* stores the low bits of a stack memory address, it may store only the lowest twenty bits in the trace packet (e.g., instead of the lowest 32 bits). In this embodiment, the tracer 104*a* may use one or more bits allocated from the reserved bits 504 to signal whether or not the low bits of a stack memory address are being stored. Some embodiments can further reduce storage requirements by storing the low fifteen bits, instead of the low twenty. For example, if the data stored in the trace packets are 32 byte values at 32 byte-aligned addresses, then the high five bits of the twenty are always zero, and need not be represented. Similarly, if the data stored in the trace packets are 64 byte values at 64 byte-aligned addresses, then the high six bits of the twenty are always zero, and need not be represented, such that the stack can be represented using fourteen bits.

Additionally, since stack accesses are normally in the form of "pushes" of data onto the stack and "pops" of data off of the stack, additional space savings may be achieved by storing relative address values, instead of storing absolute address values. For example, the tracer 104*a* may store address value in reference to a number of memory locations before or after the previously stored memory location. In this embodiment, there may be one or more bits may be allocated from the reserved bits 540 to signal that a relative address is being stored and/or which direction (i.e., before or after) the stored address is in relation to the prior stored address. Again, knowledge of whether the data being recorded is memory address aligned may enable some bits of addresses to be omitted, since it is known that they will be all zeros.

In view of the foregoing, it will be appreciated that the reserved bits 504 can be used in a variety of ways, for example, to signal whether there are sequential bits in a memory value that are the same, as size of logical groupings in the memory value, whether or not a high bits of a memory address are being stored, the location in a lookup table for high bit values, whether or not a stack address is being stored, whether or not a relative address is being stored, etc. Thus, there is a vast number and variety of reserved bits that could be used. It will also be appreciated that bits used to flag any of the forgoing need not necessarily be allocated from the reserved bits 504, but my instead be allocated from somewhere else, such as another portion of a trace packet.

Figure 8:
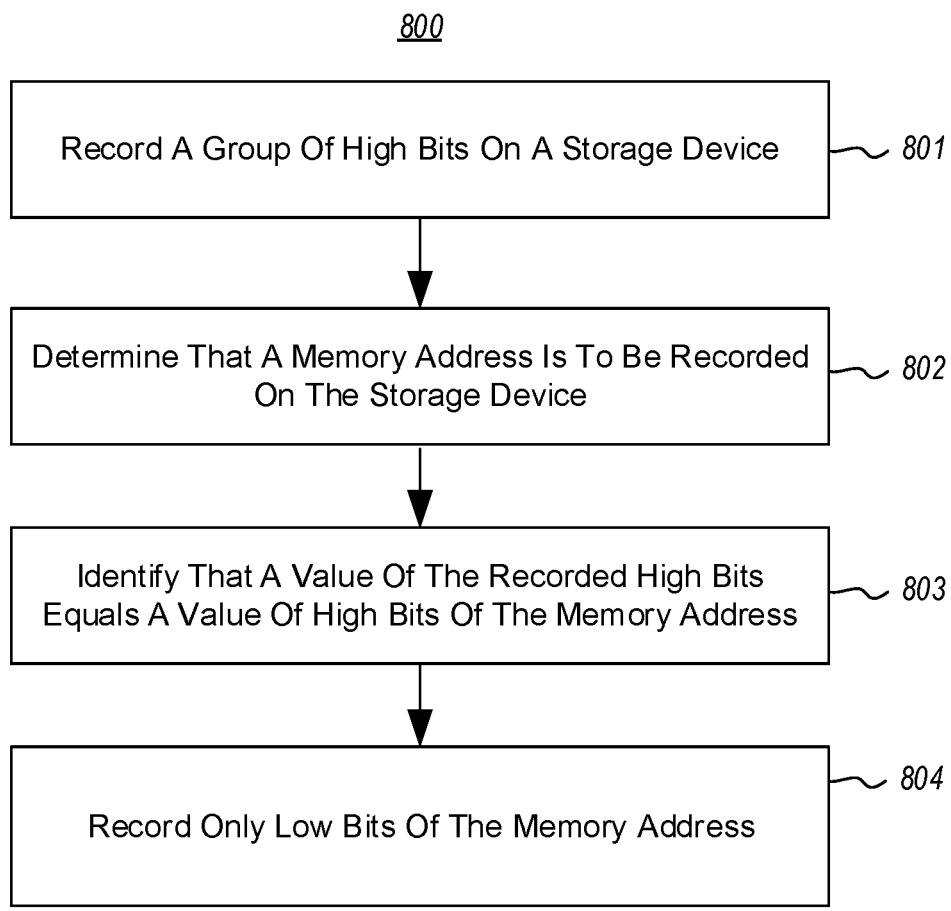
FIG. 8 illustrates a flowchart of an example method for reducing an amount of storage resources occupied when storing memory addresses on a storage device.

FIG. 8 illustrates an example of a method 800 for reducing an amount of storage resources occupied when storing memory addresses on a storage device. As depicted, method 800 includes an act 801 of recording a group of high bits on a storage device. Act 801 may comprise recording a first group of high bits of a first memory address on the storage device. For example, the first group of high bits may be recorded by the tracer 104a to the trace file(s) 104d as part of a data packet, or to a reserved portion of the trace file(s) 104d, when application 104c accesses the first memory address. Thus, method 800 may include recording a first group of high bits of the first memory address is recorded in a data packet, or recording the first group of high bits in a reserved portion of a trace file (such as a reserved portion that stores a plurality of different groups of high bits as a lookup table).

Method 800 also includes an act 802 of determining that a memory address is to be recorded on the storage device. Act 802 may comprise subsequent to recording the first group of high bits on the storage device, determining that a second memory address is to be recorded on the storage device. For example, the tracer 104d may identify that application 104c is accessing the second memory address, and determine that it should be stored on the trace file(s) 104d.

Method 800 also includes an act 803 of identifying that a value of the recorded high bits equals a value of high bits of the memory address. Act 803 may comprise identifying that a first value of the first group of high bits recorded on the storage device equals a second value of a second group of high bits of the second memory address that is to be recorded on the storage device. For example, if the high bits were stored in a trace packet, the method may comprise the tracer 104a accessing the first group of high bits from the first data packet. Alternatively, if the high bits were stored in a reserved portion of a trace file, the method may comprise the tracer 104a accessing the high bits from the reserved portion.

Method 800 also includes an act 804 of recording only low bits of the memory address. Act 804 may comprise, based at least on identifying that the first value equals the second value, recording a group of low bits of the second memory address on the storage device, while refraining from recording the second group of high bits on the storage device. For example, the tracer 104a may store the low bits as part of a trace data packet associated with the second memory address, but refrain from storing the high bits since they were already recorded in trace data packet of the trace file(s) 104d or a reserved portion of the trace files(s) 104d.

Method 800 may also comprise setting one or more flags, such as one or more flags that indicate that a data packet stores (or does not store) high bits, one or more flags identifying high bits in a reserved portion of the trace file(s), flag bits indicating that the memory address is associated with a stack and/or the memory address is a relative address, etc.

Figure 9:
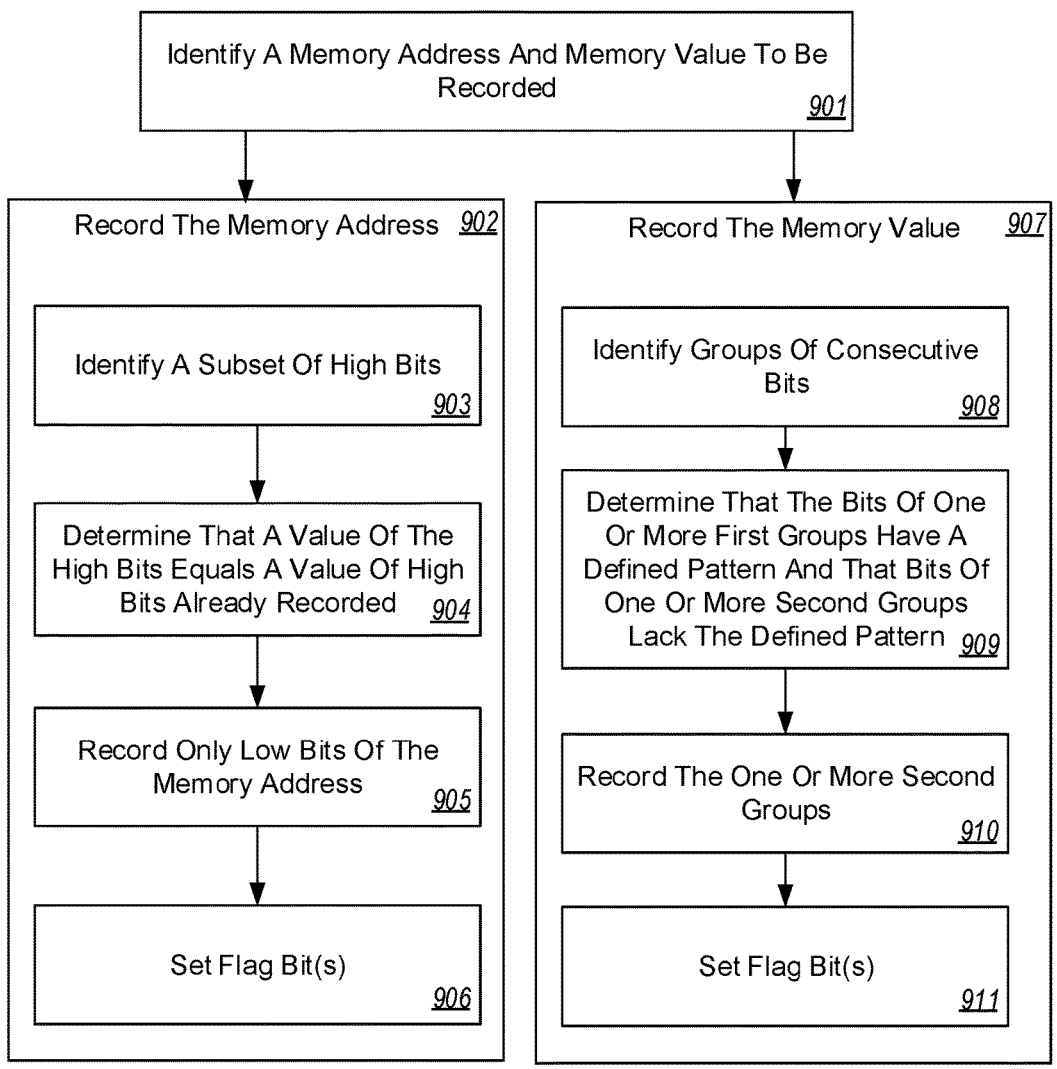
FIG. 9 illustrates a flowchart of an example method for reducing an amount of storage resources occupied when recording a memory address and a memory value.

It will be appreciated that the techniques for encoding/storing memory values and the techniques for encoding/storing memory addresses may be combined to achieve further space savings on the trace file(s) 104d. To illustrate, FIG. 9 depicts an example of a method 900 for reducing an amount of storage resources occupied when recording a memory address and a memory value.

As depicted, method 900 includes an act 901 of identifying a memory address and memory value to be recorded. Act 901 can comprise identifying a memory address and a corresponding memory value that are to be recorded onto a storage device. For example, the tracer 104a may identify that a memory address and memory value are to be recorded to the trace file(s) 104d as part of tracing application 104c.

Method 900 also includes an act 902 of recording the memory address. Act 902 can comprise recording the memory address onto the storage device. As depicted, act 902 can include a plurality of sub-acts (e.g., acts 903-906).

For example, act 902 can include an act 903 of identifying a subset of high bits. Act 903 can comprise identifying a first subset of high bits of the memory address. For example, the tracer 104a may identify a particular "high" number of bits of the memory address as being the high bits.

Act 902 can also include an act 904 of determining that a value of the high bits equals a value of high bits already recorded. Act 904 can comprise determining that a first value of the first subset of high bits equals a second value of a group of high bits that has already been recorded onto the storage device. For example, the tracer 104a may identify already recorded bits in the trace file(s) 104d, such as from a reserved portion of the trace file(s), or from a previously recorded data packet. The tracer 104a can compare the value of these already recorded high bits with the value of the high bits of the memory address.

Act 902 can also include an act 905 of recording only low bits of the memory address. Act 905 can comprise recording a second subset of low bits of the memory address onto the storage device, while refraining from recording the first subset of high bits onto the storage device. For example, the tracer 104a may record only the remaining low bits of the memory address in the trace file(s) 104d, and refrain from recording the high bits, since they are already stored in the trace file(s) 104d.

Act 902 can also include an act 906 of setting flag bit(s). Act 906 can comprise setting one or more first flag bits to indicate that only the second subset of low bits were recorded onto the storage device. For example, the tracer 104a may set one or more bits in a packet storing the low bits to indicate that the packet only stores low bits and/or to identify a particular set of already recorded high bits (such as in a lookup table) that should be used with the low bits.

Method 900 also includes an act 907 of recording the memory value. Act 907 can comprise recording the memory value onto the storage device. As depicted, act 907 can include a plurality of sub-acts (e.g., acts 908-911). As further depicted, act 907 (and its sub-acts) may be performed in any order relative to act 902 (and its sub-acts), and can even be performed in parallel with act 902 (and its sub-acts).

For example, act 907 can include an act 908 of identifying groups of consecutive bits. Act 908 can comprise identifying a plurality of groups of consecutive bits of the memory value. For example, the tracer 104a may identify that bits comprising the memory value are dividable into a plurality of groups of consecutive bits. The particular number of groups and number of bits in each group may vary based on implementation.

Act 907 can also include an act 909 of determining that bits of one or more first groups have a defined pattern and that bits of one or more second groups lack the defined pattern. Act 909 can comprise determining that a first group of the plurality of groups of consecutive bits contains bits having a defined pattern, and that a second group of the plurality of groups of consecutive bits contains bits lacking the defined pattern. For example, the tracer 104*a* may determine that the bits some of the groups have the same value (e.g., all ones or all zeros, depending on implementation), and that the all the bits in others of the groups do not have the same values (i.e., each group contains a mixture of ones and zeros).

Act 907 can also include an act 910 of recording the one or more second groups. Act 910 can comprise recording the second group of consecutive bits to the storage device, while refraining from recording at least a portion of the first group of consecutive bits to the storage device. For example, the tracer 104*a* may record only the bits of groups not comprising bits not all having the same value. Groups comprising bits all having the same value, need not be recorded, since they will be represented with compression flags.

Act 907 can also include an act 911 of setting flag bits. Act 910 can comprise setting one or more second flag bits to indicate that the first group of consecutive bits have the same value and was not recorded. For example, for each group that was not recorded the tracer 104*a* set a corresponding compression flag to indicate that that bits all have the same value, and were not recorded.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at a computer system that includes one or more processors, for reducing an amount of storage resources occupied when storing a memory value on a storage device, the method comprising:
   identifying a plurality of bits of the memory value;
   identifying a plurality of groups of bits from the plurality of bits of the memory value, each group of bits comprising a different subset of two or more consecutive bits of the plurality of bits of the memory value, wherein the plurality of groups of bits include at least one group of bits comprising a first number of bits and a second group of bits comprising a different second number of bits;
   for each of the plurality of groups of bits, determining whether or not the group's corresponding subset of consecutive bits have a defined pattern, including determining that the plurality of groups of bits include one or more of: (i) one or more first groups of bits that each comprises a corresponding subset of consecutive bits have the defined pattern, or (ii) one or more second groups of bits that each comprises a corresponding subset of consecutive bits that do not have the defined pattern;
   recording, on the storage device, a plurality of flag bits comprising at least two flag bits corresponding to each group of bits, including,
      (i) for each first group of bits, recording a first flag bit that corresponds to the group as being set,
      (ii) for each second group of bits, recording the first flag bit that corresponds to the group as being cleared, and
      (iii) for each group of bits, recording a second flag bit that indicates if the group of bits contains the first number of bits or the second number of bits; and
   recording, on the storage device, only a portion of the plurality of bits of the memory value, including (i) for each first group of bits, refraining from recording at least a portion of the group's corresponding subset of consecutive bits on the storage device to reduce the amount of storage resources occupied when storing the memory value, and (ii) for each second group of bits, recording the group's corresponding subset of consecutive bits on the storage device.

2. The method of claim 1, wherein the plurality of flag bits also comprises at least a third flag bit for each group of bits that indicates whether a value of the subset of consecutive bits corresponding to the group of bits is all ones, all zeros, or includes at least one subset of bits having defined values.

3. The method of claim 1, wherein the plurality of flag bits also comprises at least one flag bit that indicates whether a value of the bits in the one or more first groups of bits is all ones, all zeros, or includes at least one subset of bits having defined values.

4. The method of claim 1, wherein the plurality of flag bits also comprises one or more flag bits identifying the defined pattern, and a single bit for each of the plurality of groups of bits that indicates if the corresponding group of bits has the defined pattern.

5. A method, implemented at a computer system that includes one or more processors, for reducing an amount of storage resources occupied when storing memory addresses into a trace file, the method comprising:
   recording a first group of high bits of a first memory address into the trace file, wherein the first group of high bits are recorded in a reserved portion of the trace file, the reserved portion storing a plurality of different groups of high bits;
   subsequent to recording the first group of high bits into the trace file, determining that a second memory address is to be recorded into the trace file;
   identifying that a first value of the first group of high bits recorded into the trace file equals a second value of a second group of high bits of the second memory address that is to be recorded into the trace file; and
   based at least on identifying that the first value equals the second value, recording a group of low bits of the second memory address into the trace file, while refraining from recording the second group of high bits into the trace file.

6. The method of claim 5, further comprising recording a third group of high bits of a third memory address into a first data packet in the trace file.

7. The method of claim 6, further comprising setting one or more flags that indicate that the first data packet stores the third group of high bits.

8. The method of claim 6, further comprising
   subsequent to recording the third group of high bits into the first data packet in the trace file, determining that a fourth memory address is to be recorded into the trace file;
   identifying that a third value of the third group of high bits recorded into the first data packet equals a fourth value of a fourth group of high bits of the fourth memory address; and
   recording the group of low bits of the fourth memory address into a second data packet in the trace file, and setting one or more flags associated with the second data packet that indicate that that second data packet lacks high bits.

9. The method of claim 5, wherein recording the group of low bits of the second memory address into the trace file comprises setting one or more flags associated with the group of low bits that identify the first group of high bits from among the plurality of different groups of high bits.

10. The method of claim 5, wherein recording the group of low bits of the second memory address into the trace file comprises setting one or more first flags associated with the group of low bits that identify the group of low bits as being part of a memory address associated with a thread's stack.

11. The method of claim 10, further comprising setting one or more second flags associated with the group of low bits that identify the group of low bits as representing a relative address.

12. The method of claim 5, wherein the plurality of different groups of high bits comprises high bits of memory addresses most frequently accessed by a thread.

13. The method of claim 12, wherein at least one of the plurality of different groups of high bits is evicted from the reserved portion of the trace file when a new memory address becomes most frequently accessed by the thread.

14. The method of claim 5, wherein the plurality of different groups of high bits include one or more first groups of high bits corresponding to a stack, and one or more second groups of high bits corresponding to a heap, and wherein the one or more first groups of high bits are distinguishable from the one or more second groups of high bits based on how processor instructions are permitted to accesses memory segments.

15. A method, implemented at a computer system that includes one or more processors, for reducing an amount of storage resources occupied when recording a memory address and a memory value, the method comprising:

identifying a memory address and a corresponding memory value that are to be recorded onto a storage device;

recording the memory address onto the storage device, including:
  identifying a first subset of high bits of the memory address;
  determining that a first value of the first subset of high bits equals a second value of a group of high bits that has already been recorded into a trace file, wherein the group of high bits are recorded in a reserved portion of the trace file, the reserved portion storing a plurality of different groups of high bits;
  recording a second subset of low bits of the memory address into the trace file, while refraining from recording the first subset of high bits into the trace file; and
  setting one or more first flag bits to indicate that only the second subset of low bits were recorded into the trace file; and
recording the memory value into the trace file, including:
  identifying a plurality of groups of consecutive bits of the memory value;
  determining that a first group of the plurality of groups of consecutive bits contains bits having a defined pattern, and that a second group of the plurality of groups of consecutive bits contains bits lacking the defined pattern;
  recording the second group of consecutive bits into the trace file, while refraining from recording at least a portion of the first group of consecutive bits into the trace file; and
  setting one or more second flag bits to indicate that the first group of consecutive bits have the same value and was not recorded.

16. The method of claim 1, wherein the plurality of flag bits also comprises one or more flag bits that indicate a number of the plurality of groups of bits that are represented by the plurality of flag bits.

* * * * *